(12) United States Patent
Kozlowski et al.

(10) Patent No.: US 7,608,663 B2
(45) Date of Patent: Oct. 27, 2009

(54) METHOD OF PREPARING PROPIONIC ACID-TERMINATED POLYMERS

(75) Inventors: Antoni Kozlowski, Huntsville, AL (US); Samuel P. McManus, Huntsville, AL (US)

(73) Assignee: Nektar Therapeutics, San Carlos, CA (US)

( * ) Notice: Subject to any disclaimer, the term of this patent is extended or adjusted under 35 U.S.C. 154(b) by 315 days.

(21) Appl. No.: 11/040,142

(22) Filed: Jan. 21, 2005

(65) Prior Publication Data

US 2005/0171291 A1 Aug. 4, 2005

Related U.S. Application Data

(60) Provisional application No. 60/538,006, filed on Jan. 21, 2004.

(51) Int. Cl.
   C08G 65/08 (2006.01)
   C08G 65/332 (2006.01)
   C08F 8/12 (2006.01)
   C08F 8/14 (2006.01)

(52) U.S. Cl. ............... 525/59; 525/61; 525/259; 525/307; 525/326.1; 525/328.8; 525/329.7; 525/330.3; 525/404; 525/408; 525/409; 525/523; 525/530; 525/531

(58) Field of Classification Search .......... 525/59, 525/61, 259, 307, 326.1, 328.8, 329.7, 330.3, 525/404, 408, 409, 523, 530, 531
See application file for complete search history.

(56) References Cited

U.S. PATENT DOCUMENTS

| | | |
|---|---|---|
| 4,248,786 A | 2/1981 | Batz et al. |
| 4,670,417 A | 6/1987 | Iwasaki et al. |
| 4,943,626 A | 7/1990 | McGrath et al. |
| 4,948,915 A | 8/1990 | Keen |
| 4,996,356 A | 2/1991 | Takahashi et al. |
| 5,034,559 A | 7/1991 | Hickmann |
| 5,081,285 A | 1/1992 | Unruh et al. |
| 5,157,075 A | 10/1992 | Kanai et al. |
| 5,256,819 A | 10/1993 | Fried |
| 5,328,955 A | 7/1994 | Rhee et al. |
| 5,483,008 A | 1/1996 | Sakurai et al. |
| 5,523,479 A | 6/1996 | Sanders et al. |
| 5,614,549 A | 3/1997 | Greenwald et al. |
| 5,672,662 A | 9/1997 | Harris et al. |
| 5,681,567 A | 10/1997 | Martinez et al. |
| 5,840,900 A | 11/1998 | Greenwald et al. |
| 6,441,136 B1 | 8/2002 | Pettit |
| 6,495,659 B2 | 12/2002 | Bentley et al. |
| 6,583,272 B1 | 6/2003 | Bailon |
| 2004/0219131 A1 | 11/2004 | Patten et al. |

FOREIGN PATENT DOCUMENTS

| | | | |
|---|---|---|---|
| EP | 0067029 | | 4/1986 |
| JP | 2000-204153 | * | 7/2000 |
| JP | 2000204153 A | | 7/2000 |
| WO | WO 92/01474 | | 2/1992 |
| WO | WO 97/03106 | | 1/1997 |
| WO | WO 99/45964 | | 9/1999 |

OTHER PUBLICATIONS

English translation of JP 2000-204153, published Jul. 2000.*
http://www.sejinbio.co.kr/single-arm%20PE.htm, downloaded Dec. 8, 2008.*
Quotation SW041102-02SS, Shearwater Corporation, 2002.
Invoice No. 001229, Shearwater Corporation, 2002.
Invoice No. 001380, Shearwater Corporation, 2002.
Invoice No. 001381, Nektar Therapeutics, 2002.
Invoice No. 001574, Shearwater Corporation, 2002.
Invoice No. 000965, Nektar Therapeutics, 2002.
Invoice No. 002867, Nektar Therapeutics, 2003.

* cited by examiner

*Primary Examiner*—Roberto Rábago
(74) *Attorney, Agent, or Firm*—Mark A. Wilson

(57) ABSTRACT

The invention provides methods for preparing polymers bearing a terminal propionic acid. The method involves first reacting a water soluble and non-peptidic polymer comprising at least one hydroxyl group with a tertiary alkyl acrylate in the presence of a catalyst to form a propionic acid ester of the polymer, wherein the polymer has a weight average molecular weight of at least about 10,000 Da; and then treating the propionic acid ester of the polymer with a strong acid to form a propionic acid of the polymer.

28 Claims, No Drawings

METHOD OF PREPARING PROPIONIC ACID-TERMINATED POLYMERS

CROSS-REFERENCE TO RELATED APPLICATION

This application claims the benefit of priority to U.S. Provisional Patent Application Ser. No. 60/538,006, filed Jan. 21, 2004, which is incorporated herein by reference.

FIELD OF THE INVENTION

This invention relates to methods for preparing water soluble and non-peptidic polymers carrying substituted or unsubstituted propionic acid functional groups, particularly propionic acid-terminated poly(ethylene glycol) polymers.

BACKGROUND OF THE INVENTION

Poly(ethylene glycol) (PEG) derivatives activated with electrophilic groups are useful for coupling to amino groups of biologically active molecules, such as proteins. In particular, active esters of carboxylic acid derivatives of PEG have been used to attach PEG to proteins bearing amino groups.

U.S. Pat. No. 5,672,662 discloses PEG derivatives having a terminal propionic or butanoic acid moiety that can be used to prepare active esters suitable for conjugation to proteins or other molecules bearing amino groups. The synthetic method for propionic acid-substituted PEG described in the patent involves Michael addition of poly(ethylene glycol) to acrylonitrile followed by hydrolysis of the nitrile to form the carboxyl group. Hydrolysis of the nitrile requires severe reaction conditions, such as treatment with concentrated sulfuric acid at 95° C. or higher. The ether linkages in PEG are sensitive to such conditions and significant chain cleavage and reduction in yield can result from this process, particularly when relatively high molecular weight polymers are involved, such as polymers having a molecular weight above about 10,000 Da.

U.S. Pat. No. 5,523,479 to Sanders et al. discloses a method for forming ethercarboxylic acids by reacting an alcohol having a molecular weight of 32 to 6,000 Da with a tertiary alkyl ester of an $\alpha,\beta$-unsaturated carboxylic acid in the presence of a catalyst, such as potassium hydroxide, followed by acid hydrolysis. The Sanders et al. patent does not address the use of higher molecular weight polymer reagents, such as PEG polymers having a molecular weight of about 10,000 Da or higher.

There is a need in the art for alternative methods for preparing propionic acid-terminated polymers, particularly high molecular weight polymers, in high yield without utilizing harsh reaction conditions that can cause chain cleavage within the polymer backbone (e.g., at the terminal methoxy group in the polymer backbone).

SUMMARY OF THE INVENTION

The present method avoids the harsh hydrolysis conditions that characterize conventional methods for producing propionic acid-terminated polymers. Instead, the method of the invention first involves a Michael addition reaction between a tertiary alkyl acrylate and a polymer functionalized with at least one hydroxyl group, followed by removal of a tertiary alkyl group from the terminal ester to form a carboxyl group using relatively mild conditions, such as treatment with trifluoroacetic acid at about 50° C.

In one aspect, the present invention provides a method for preparing a water soluble and non-peptidic polymer functionalized with at least one propionic acid group, the method comprising:

i) reacting a water soluble and non-peptidic polymer comprising at least one hydroxyl group with a tertiary alkyl acrylate or substituted tertiary alkyl acrylate in the presence of a catalyst to form a substituted or unsubstituted propionic acid ester of the polymer, wherein the polymer has a weight (or number) average molecular weight of at least about 10,000 Da; and ii) treating the substituted or unsubstituted propionic acid ester of the polymer with a strong acid, such as (for example) trifluoroacetic acid, trifluoromethanesulfonic acid, formic acid, hydrochloric acid, or p-toluenesulfonic acid, to form a propionic or substituted propionic acid of the polymer.

The tertiary alkyl acrylate can be $\alpha$- or $\beta$-substituted and exemplary substituting groups include halo, hydroxyl, thiol, alkylthio, acyl, acyloxy, nitro, cyano, azido, trihalomethyl, alkyl, substituted alkyl, cycloalkyl, substituted cycloalkyl, alkoxy, substituted alkoxy, aryl, substituted aryl, heterocycle, substituted heterocycle, heteroaryl, and substituted heteroaryl. In one preferred embodiment, the tertiary alkyl acrylate is $\alpha$- or $\beta$-substituted, preferably $\alpha$-substituted, with methyl, ethyl, n-propyl, isopropyl, n-butyl, isobutyl, sec-butyl, tert-butyl, or benzyl. Preferred tertiary alkyl groups of the tertiary alkyl acrylate include tert-butyl, tert-amyl, $\alpha,\alpha'$-dimethylbenzyl, trityl, 1-adamantyl, and 2-methyl-2-adamantyl.

In one or more embodiments, the tertiary alkyl acrylate has the structure:

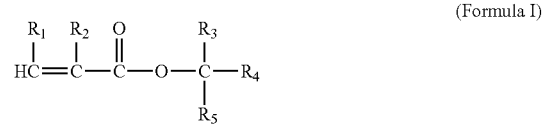

(Formula I)

wherein:

$R_1$ and $R_2$ are each independently selected from the group consisting of hydrogen, halo, hydroxyl, thiol, alkylthio, acyl, acyloxy, nitro, cyano, azido, trihalomethyl, alkyl, substituted alkyl, cycloalkyl, substituted cycloalkyl, alkoxy, substituted alkoxy, aryl, substituted aryl, heterocycle, substituted heterocycle, heteroaryl, and substituted heteroaryl; and $R_3$-$R_5$ (that is, each of $R_3$, $R_4$ and $R_5$) are each independently alkyl, substituted alkyl, aryl or substituted aryl.

Preferably, $R_3$, $R_4$, and $R_5$, are each methyl, ethyl, or phenyl, and $R_1$ and $R_2$ are hydrogen or $R_1$ is hydrogen and $R_2$ is methyl, ethyl, n-propyl, isopropyl, n-butyl, isobutyl, sec-butyl, tert-butyl, or benzyl.

The catalyst used in the Michael addition reaction is preferably a quaternary ammonium hydroxide, such as a tetraalkyl ammonium halide or hydroxide (e.g., tetramethyl ammonium hydroxide, tetraethyl ammonium hydroxide, tetrapropyl ammonium hydroxide, or tetrabutyl ammonium hydroxide, as well as the corresponding halides). In one or more embodiments, the quaternary ammonium hydroxide has the structure:

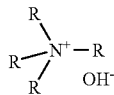

(Formula II)

wherein each R is independently alkyl or substituted alkyl (e.g., C1-C8 alkyl). In addition, ⁻OH counter ion can be substituted for halo, wherein halo represents fluoro, chloro, bromo, and iodo.

Both the reacting step i) and treating step ii) can be conducted in the presence of an organic solvent, such as dichloromethane (DCM), tetrahydrofuran (THF), dimethylformamide (DMF), dimethylsulfoxide (DMSO), acetonitrile, toluene, benzene, xylene, phenylacetonitrile, nitrobenzene, tetrachloroethylene, anisole, chlorobenzene, and tert-butanol.

The polymer bearing at least one hydroxyl group is preferably poly(ethylene glycol), but can be any other water-soluble and non-peptidic polymer, such as other poly(alkylene glycols), poly(olefinic alcohol), poly(vinylpyrrolidone), poly(hydroxyalkylmethacrylamide), poly(hydroxyalkylmethacrylate), poly(saccharides), poly(α-hydroxyacetic acid), poly(acrylic acid), poly(vinyl alcohol), polyphosphazene, polyoxazolines, poly(N-acryloylmorpholine), and copolymers or terpolymers thereof. The polymer preferably has a weight (or number) average molecular weight of about 10,000 to about 100,000 Da, more preferably about 10,000 to about 40,000 Da. The PEG polymer or other polymer can have any of a variety of structures and geometric configurations, including, for example, monofunctional PEG, difunctional PEG, and branched PEG.

Following formation of the carboxylic acid group, the propionic acid functionalized polymer can be derivatized to form an acid derivative such as acyl halide, acyl pseudohalide, ester, anhydride, amide, imide, or hydrazide. Furthermore, the acid or certain functionalized polymers, e.g. active esters, can be used as intermediates to react with appropriate reagents or other small molecules or short polymeric species to form yet additional reactive derivatives such as maleimides, thiols, reactive disulfides, acetals, aldehydes and the like. In one embodiment, the propionic acid-functionalized polymer is derivatized to form an active ester. Exemplary active ester groups include N-hydroxysuccinimidyl ester, o-, m-, or p-nitrophenyl ester, 1-hydroxybenzotriazolyl ester, imidazolyl ester, and N-hydroxysulfosuccinimidyl ester.

In a preferred embodiment of the invention, the method for preparing a poly(ethylene glycol) (PEG) polymer functionalized with at least one propionic acid group comprises:

i) reacting a PEG polymer with a tertiary alkyl acrylate or substituted tertiary alkyl acrylate in the presence of a quaternary ammonium hydroxide to form a propionic acid or substituted propionic acid ester of PEG, wherein the PEG polymer is a monofunctional PEG, difunctional PEG, or branched PEG molecule comprising 1 to about 25 hydroxyl groups and having a number average molecular weight of at least about 10,000 Da;

ii) treating the propionic acid or substituted propionic acid ester of PEG with a strong acid, such as (for example) trifluoroacetic acid, trifluoromethanesulfonic acid, formic acid, hydrochloric acid, or p-toluenesulfonic acid, to form a PEG polymer functionalized with at least one propionic acid or substituted propionic acid group;

iii) optionally, chromatographically purifying the PEG polymer functionalized with at least one propionic acid group;

iii) optionally, derivatizing the propionic acid or substituted propionic acid functionalized PEG to form, for example, an active ester selected from the group consisting of N-hydroxysuccinimidyl ester, o-, m-, or p-nitrophenyl ester, 1-hydroxybenzotriazolyl ester, imidazolyl ester, and N-hydroxysulfosuccinimidyl ester; and v) optionally, chromatographically purifying the active ester of PEG.

DETAILED DESCRIPTION OF THE INVENTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

I. DEFINITIONS

Before describing the present invention in detail, it is to be understood that this invention is not limited to the particular polymers, synthetic techniques, active agents, and the like as such may vary. It is also to be understood that the terminology used herein is for describing particular embodiments only, and is not intended to be limiting.

It must be noted that, as used in this specification, the singular forms "a," "an," and "the" include plural referents unless the context clearly dictates otherwise. Thus, for example, reference to a "polymer" includes a single polymer as well as two or more of the same or different polymers, reference to a "conjugate" refers to a single conjugate as well as two or more of the same or different conjugates, reference to an "excipient" includes a single excipient as well as two or more of the same or different excipients, and the like.

In describing and claiming the present invention, the following terminology will be used in accordance with the definitions described below.

"PEG" or "polyethylene glycol," as used herein, is meant to encompass any water-soluble poly(ethylene oxide). Typically, PEGs for use in the present invention will comprise one of the two following structures: "—O(CH$_2$CH$_2$O)$_m$—" or "—CH$_2$CH$_2$O(CH$_2$CH$_2$O)$_m$—CH$_2$CH$_2$—," where (m) is 3 to 3000, and the terminal groups and architecture of the overall PEG may vary. "PEG" means a polymer that contains a majority, that is to say, greater than 50%, of subunits that are —CH$_2$CH$_2$O—. One commonly employed PEG is end-capped PEG. When PEG is defined as "—O(CH$_2$CH$_2$O)$_m$-" the end capping group is generally a carbon-containing group typically comprised of 1-20 carbons and is preferably alkyl (e.g., methyl, ethyl or benzyl) although saturated and unsaturated forms thereof, as well as aryl, heteroaryl, cyclo, heterocyclo, and substituted forms of any of the foregoing are also envisioned. When PEG is defined as "—CH$_2$CH$_2$O(CH$_2$CH$_2$O)$_m$—CH$_2$CH$_2$—," the end capping group is generally a carbon-containing group typically comprised of 1-20 carbon atoms and an oxygen atom that is covalently bonded to the group and is available for covalently bonding to one terminus of the PEG. In this case, the group is typically alkoxy (e.g., methoxy, ethoxy or benzyloxy) and with respect to the carbon-containing group can optionally be saturated and unsaturated, as well as aryl, heteroaryl, cyclo, heterocyclo, and substituted forms of any of the foregoing. The other ("non-end-capped") terminus is a typically hydroxyl, amine or an activated group that can be subjected to further chemical modification when PEG is defined as "—$CH_2CH_2O(CH_2CH_2O)_m$—$CH_2CH_2$—." In addition, the end-capping group can also be a silane. Specific PEG forms for use in the invention include PEGs having a variety of molecular weights, structures or geometries (e.g., branched, linear, forked PEGs, multifunctional, and the like), to be described in greater detail below.

The end-capping group can also advantageously comprise a detectable label. When the polymer has an end-capping group comprising a detectable label, the amount or location of the polymer and/or the moiety (e.g., active agent) to which the polymer is attached can be determined by using a suitable detector. Such labels include, without limitation, fluorescers, chemiluminescers, moieties used in enzyme labeling, colorimetric (e.g., dyes), metal ions, radioactive moieties, and the like.

"Molecular mass" in the context of a water-soluble, non-peptidic polymer of the invention such as PEG, refers to the weight average molecular weight of a polymer, typically determined by size exclusion chromatography, light scattering techniques, or intrinsic viscosity determination in an organic solvent like 1,2,4-trichlorobenzene. The polymers of the invention are typically polydisperse, possessing low polydispersity values of less than about 1.05.

"Activated carboxylic acid" means a functional derivative of a carboxylic acid that is more reactive than the parent carboxylic acid, in particular, with respect to nucleophilic acyl substitution. Activated carboxylic acids include but are not limited to acid halides (such as acid chlorides), anhydrides, amides and esters.

The term "reactive" or "activated" when used in conjunction with a particular functional group, refers to a reactive functional group that reacts readily with an electrophile or a nucleophile on another molecule. This is in contrast to those groups that require strong catalysts or highly impractical reaction conditions in order to react (i.e., a "nonreactive" or "inert" group).

The terms "protected" or "protecting group" or "protective group" refer to the presence of a moiety (i.e., the protecting group) that prevents or blocks reaction of a particular chemically reactive functional group in a molecule under certain reaction conditions. The protecting group will vary depending upon the type of chemically reactive group being protected as well as the reaction conditions to be employed and the presence of additional reactive or protecting groups in the molecule, if any. Protecting groups known in the art can be found in Greene, T. W., et al., *Protective Groups in Organic Synthesis*, 3rd ed., John Wiley & Sons, New York, N.Y. (1999).

As used herein, the term "functional group" or any synonym thereof is meant to encompass protected forms thereof.

The term "spacer" or "spacer moiety" is used herein to refer to an atom or a collection of atoms optionally used to link interconnecting moieties such as a terminus of a water-soluble polymer portion and an electrophile. The spacer moieties of the invention may be hydrolytically stable or may include a physiologically hydrolyzable or enzymatically degradable linkage.

"Alkyl" refers to a hydrocarbon chain, typically ranging from about 1 to 20 atoms in length. Such hydrocarbon chains are preferably but not necessarily saturated and may be branched or straight chain, although typically straight chain is preferred. Exemplary alkyl groups include ethyl, propyl, butyl, pentyl, 2-methylbutyl, 2-methylpropyl(isobutyl), 3-methylpentyl, and the like. As used herein, "alkyl" includes cycloalkyl or cycloalkylene when three or more carbon atoms are referenced.

"Lower alkyl" refers to an alkyl group containing from 1 to 6 carbon atoms, and may be straight chain or branched, as exemplified by methyl, ethyl, n-butyl, i-butyl, t-butyl.

"Cycloalkyl" refers to a saturated or unsaturated cyclic hydrocarbon chain, including bridged, fused, or spiro cyclic compounds, preferably made up of 3 to about 12 carbon atoms, more preferably 3 to about 8.

As used herein, "alkenyl" refers to a branched or unbranched hydrocarbon group of 1 to 15 atoms in length, containing at least one double bond, such as ethenyl, n-propenyl, isopropenyl, n-butenyl, isobutenyl, octenyl, decenyl, tetradecenyl, and the like.

The term "alkynyl" as used herein refers to a branched or unbranched hydrocarbon group of 2 to 15 atoms in length, containing at least one triple bond, such as ethynyl, n-propynyl, isopentynyl, n-butynyl, octynyl, decynyl, and so forth.

"Alkoxy" refers to an —O—R group, wherein R is alkyl or substituted alkyl, preferably C1-C20 alkyl (e.g., methyl, ethyl, propyl, benzyl, etc.), preferably C1-C8.

"Non-interfering substituents" are those groups that, when present in a molecule, are typically non-reactive with other functional groups contained within the molecule.

The term "substituted" as in, for example, "substituted alkyl," refers to a moiety (e.g., an alkyl group) substituted with one or more non-interfering substituents, such as, but not limited to: C3-C8 cycloalkyl, e.g., cyclopropyl, cyclobutyl, and the like; halo, e.g., fluoro, chloro, bromo, and iodo; cyano; alkoxy; phenyl; substituted phenyl; and the like.

"Aryl" means one or more aromatic rings, each of 5 or 6 core carbon atoms. Aryl includes multiple aryl rings that may be fused, as in naphthyl or unfused, as in biphenyl. Aryl rings may also be fused or unfused with one or more cyclic hydrocarbon, heteroaryl, or heterocyclic rings. As used herein, "aryl" includes heteroaryl.

"Substituted aryl" is aryl having one or more non-interfering groups as a substituent. For substitutions on a phenyl ring, the substituents may be in any orientation (i.e., ortho, meta, or para).

"Heterocycle" or "heterocyclic" means one or more rings of 5-12 atoms, preferably 5-7 atoms, with or without unsaturation or aromatic character and having at least one ring atom which is not a carbon. Preferred heteroatoms include sulfur, oxygen, and nitrogen.

"Substituted heterocycle" is a heterocycle having one or more side chains formed from non-interfering substituents.

"Heteroaryl" is an aryl group containing from one to four heteroatoms, preferably N, O, or S, or a combination thereof. Heteroaryl rings may also be fused with one or more cyclic hydrocarbon, heterocyclic, aryl, or heteroaryl rings.

"Substituted heteroaryl" is heteroaryl having one or more non-interfering groups as substituents.

"Electrophile" refers to an ion or atom or a neutral or ionic collection of atoms having an electrophilic center, i.e., a center that is electron seeking or capable of reacting with a nucleophile.

"Nucleophile" refers to an ion or atom or a neutral or ionic collection of atoms having a nucleophilic center, i.e., a center that is seeking an electrophilic center or capable of reacting with an electrophile.

A "physiologically cleavable" or "hydrolyzable" or "degradable" bond is a relatively weak bond that reacts with water (i.e., is hydrolyzed) under physiological conditions. The tendency of a bond to hydrolyze in water will depend not only on the general type of linkage connecting two central atoms but also on the substituents attached to these central atoms. Appropriate hydrolytically unstable or weak linkages include, but are not limited to, carboxylate ester, phosphate ester, anhydrides, acetals, ketals, acyloxyalkyl ether, imines, orthoesters, and oligonucleotides.

An "enzymatically degradable linkage" means a linkage that is subject to degradation by one or more enzymes.

A "hydrolytically stable" linkage or bond refers to a chemical bond, typically a covalent bond, that is substantially stable in water, that is to say, does not undergo hydrolysis under physiological conditions to any appreciable extent over an extended period of time. Examples of hydrolytically stable linkages include but are not limited to the following: carbon-carbon bonds (e.g., in aliphatic chains), ethers, amides, urethanes, and the like. Generally, a hydrolytically stable linkage is one that exhibits a rate of hydrolysis of less than about 1-2% per day under physiological conditions. Hydrolysis rates of representative chemical bonds can be found in most standard chemistry textbooks.

"Pharmaceutically acceptable excipient" or "pharmaceutically acceptable carrier" refers to an excipient that can be included in the compositions of the invention and that causes no significant adverse toxicological effects to the patient.

"Pharmacologically effective amount," "physiologically effective amount," and "therapeutically effective amount" are used interchangeably herein to mean the amount of a PEG-active agent conjugate present in a pharmaceutical preparation that is needed to provide a desired level of active agent and/or conjugate in the bloodstream or in the target tissue. The precise amount will depend upon numerous factors, e.g., the particular active agent, the components and physical characteristics of pharmaceutical preparation, intended patient population, patient considerations, and the like, and can readily be determined by one skilled in the art, based upon the information provided herein and available in the relevant literature.

"Multifunctional" in the context of a polymer of the invention means a polymer having 3 or more functional groups contained therein, where the functional groups may be the same or different. Multifunctional polymers of the invention will typically contain from about 3-100 functional groups, or from 3-50 functional groups, or from 3-25 functional groups, or from 3-15 functional groups, or from 3 to 10 functional groups, or will contain 3, 4, 5, 6, 7, 8, 9 or 10 functional groups within the polymer backbone.

A "difunctional" polymer means a polymer having two functional groups contained therein, either the same (i.e., homodifunctional) or different (i.e., heterodifunctional).

A basic or acidic reactant described herein includes neutral, charged, and any corresponding salt forms thereof.

The term "patient," refers to a living organism suffering from or prone to a condition that can be prevented or treated by administration of a conjugate, and includes both humans and animals.

"Optional" or "optionally" means that the subsequently described circumstance may or may not occur, so that the description includes instances where the circumstance occurs and instances where it does not.

Unless otherwise noted, molecular weight is expressed herein as number average molecular weight ($M_n$), which is defined as $$\frac{\sum N_i M_i}{\sum N_i},$$

wherein $N_i$ is the number of polymer molecules (or the number of moles of those molecules) having molecular weight $M_i$.

As used herein, "non-peptidic" refers to a polymer backbone substantially free of peptide linkages. However, the polymer backbone may include a minor number of peptide linkages spaced along the length of the backbone, such as, for example, no more than about 1 peptide linkage per about 50 monomer units.

II. METHOD OF PREPARING PROPIONIC ACID FUNCTIONALIZED POLYMERS

The method of the invention provides a synthetic route for forming water soluble and non-peptidic polymers functionalized with at least one propionic acid group. The method involves reaction of a polymer comprising at least one hydroxyl group, such as monofunctional, difunctional or multifunctional PEG molecules, with a tertiary alkyl acrylate reagent in a Michael addition reaction, which results in a polymer substituted with at least one tertiary alkyl ester of propionic acid. The ester is then hydrolyzed under relatively mild conditions as compared to the hydrolysis conditions required for a nitrile group. The hydrolysis conditions used in the method of the invention do not cause yield-reducing degradation and chain cleavage of the polymer backbone, thereby making the method particularly well-suited for higher molecular weight polymers, such as polymers having a molecular weight of greater than about 10,000 Da.

In a preferred embodiment, a catalyst is used to promote the Michael addition reaction. The choice of catalyst is particularly important for higher molecular weight polymer starting materials because, as indicated in Comparative Example 1, certain catalysts in the art are unable to advance the Michael addition reaction to any significant degree. A preferred catalyst comprises a quaternary ammonium hydroxide. Exemplary quaternary ammonium hydroxides include tetramethyl ammonium hydroxide, tetraethyl ammonium hydroxide, tetrapropyl ammonium hydroxide, and tetrabutyl ammonium hydroxide. Quaternary ammonium hydroxides can be used directly or generated in situ from corresponding quaternary ammonium salts, preferably halides. If a quaternary ammonium halide salt is used, it is necessary to activate the ammonium salt by addition of an alkali metal or alkaline earth metal hydroxide, such as KOH or NaOH, as shown in Examples 1 and 3. The catalyst can be dissolved in the same organic solvent as the reaction reagents or added in the form of an aqueous solution.

In one embodiment, the quaternary ammonium hydroxide has the structure:

(Formula II)

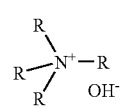

wherein each R is independently alkyl or substituted alkyl, preferably substituted or unsubstituted C1-8 alkyl.

Hydrolysis of the tertiary alkyl ester group can be accomplished by treatment with any strong acid, such as various solutions of mineral acids (e.g., hydrohalic acids, sulfuric acid, phosphorous acid, and the like) or organic acids. One preferred acid is trifluoroacetic acid (TFA). Examples of other suitable acids include formic acid, hydrochloric acid, p-toluenesulfonic acid, and trifluoromethanesulfonic acid.

The reagents in both the Michael addition step and the subsequent hydrolysis step are preferably dissolved in a suitable organic solvent. Exemplary organic solvents include dichloromethane (DCM), tetrahydrofuran (THF), dimethylformamide (DMF), dimethylsulfoxide (DMSO), acetonitrile, toluene, benzene, xylene, phenylacetonitrile, nitrobenzene, tetrachloroethylene, anisole, chlorobenzene, tert-butanol, and the like.

The Michael addition reaction can be carried out at any temperature that maintains the polymer starting material (i.e., the polymeric alcohol) in a liquid state. Preferably, the temperature is about 20 to about 120° C., more preferably about 20 to about 60° C. Such temperatures are lower than those typically suggested, and represents relatively gentler reaction conditions, especially in the presence of basic catalyst, thereby practically eliminating degradation and chain cleavage of the polymer backbone. The Michael addition reaction time is typically about 6 hours to about 24 hours. The polymer is typically reacted with the tertiary alkyl acrylate using an excess of the acrylate reagent (e.g., up to about 30 fold molar excess) in order to promote substantially complete conversion of the polymeric alcohol. The catalyst is typically present in an amount of about 0.05 weight percent to about 20 weight percent based on the weight of the starting polymer.

The acid-promoted hydrolysis step typically comprises treating the propionic acid ester of the polymer with a strong acid, preferably an organic acid, at a temperature of about 20 to about 100° C., preferably at the lower end of the range, for about 0.5 hours to about 6 hours. The use of organic acids with relatively lower temperatures represents milder reaction conditions than required for the hydrolysis of, for example, nitrites as evidenced in U.S. Pat. No. 5,672,662, with the result of practically eliminating degradation and chain cleavage of the polymer backbone. Following conversion of the ester to the desired acid, any organic solvents or acids, such as trifluoroacetic acid, can be removed by distillation. Thereafter, the desired product is preferably dissolved in deionized water and treated with a strong base to hydrolyze any esters of residual polymeric alcohol (e.g., PEG-OH) and acid (e.g., trifluoroacetic acid), followed by treatment with a strong mineral acid (for pH adjustment) to convert the resulting salt of the polymer-propionic acid (e.g., PEG-propionic acid) to the free acid form. The product is then extracted using a chlorinated solvent such as dichloromethane and concentrated. The desired product can then be purified using methods known in the art for polymers of this type.

Using the method of the invention, propionic acid-functionalized polymers can be produced in high yield with a high degree of polymer substitution. Typically, the percentage of polymer substitution of the propionic acid ester onto the polymeric alcohol is at least about 70%, preferably at least about 80%, and most preferably at least about 90% substitution. The product yield is typically at least about 60%, more preferably at least about 70%, and most preferably at least about 80%.

A general reaction scheme of the present invention, denoted as Reaction Scheme I, is shown below. As shown, an mPEG-OH molecule is reacted with a tert-butyl acrylate substituted at the α-carbon as described in greater detail below. A quaternary ammonium halide activated with KOH is used as a catalyst for the Michael addition step. Trifluoroacetic acid ("TFA") is used in an acid-promoted hydrolysis step to remove the tert-butyl protecting group. In Reaction Scheme I, "Me" represents methyl, "n" represents the number of repeating ethylene oxide monomers, "t-Bu" represents t-butyl, and $R_2$ is as defined in Section II.B.

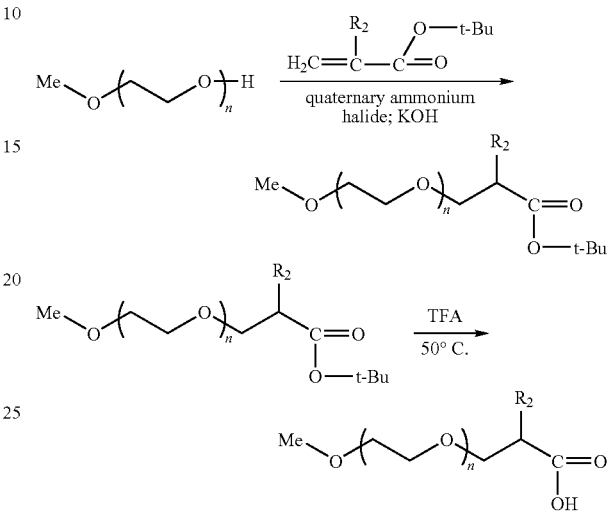

In exemplary Reaction Scheme II below, a method according to the invention is outlined that includes formation of an active NHS ester following purification of the propionic acid functionalized polymer.

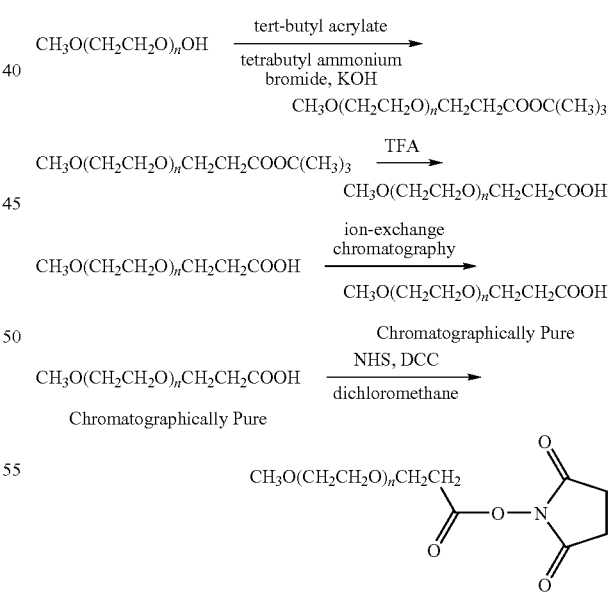

As explained more fully below, the polymeric alcohol starting material may comprise any water soluble and non-peptidic polymer having any of a wide variety of geometric configurations (e.g., linear, branched, forked, and so forth). For the sake of simplicity, the above reaction schemes illustrate use of a monofunctional polymer having a single hydroxyl group. However, the polymer may comprise more than one hydroxyl group, such as 1 to about 25 hydroxyl groups (e.g., 1, 2, 3, 4, 5, 6, 7, 8, 9, 10 or more hydroxyl groups).

If a methoxy-PEG-OH is used as the raw material, as shown in Reaction Scheme II, this process produces the active ester with the polymer backbone chain impact. That is, there is no observable chain cleavage from the acid-catalyzed hydrolysis of the ester. While not wishing to be bound by theory, it is believed the absence of chain cleavage is the result of using relatively reduced temperatures and a milder organic acid such as trifluoroacetic acid followed by base treatment. This lack of chain cleavage and especially the lack of terminal demethylation (thereby resulting in a lack of demethylated product), results in a significant difference and advantage over the propionic acid-terminated polymers (and corresponding active esters) prepared in accordance with the process described in the U.S. Pat. No. 5,672,662. Additionally, the conjugates prepared from active reagents derived from PEG-propionic acid manufactured using U.S. Pat. No. 5,672,662 would suffer by comparison to conjugates prepared using the present method.

A. Water Soluble and Non-Peptidic Polymers

The polymer should be non-toxic and biocompatible, meaning that the polymer is capable of coexistence with living tissues or organisms without causing harm. When referring to the polymer, it is to be understood that the polymer can be any of a number of water soluble and non-peptidic polymers, such as those described herein as suitable for use in the present invention. Preferably, poly(ethylene glycol) (i.e., PEG) is the polymer. The term PEG includes poly(ethylene glycol) in any of a number of geometries or forms, including linear forms (e.g., methoxy-PEG-OH, benzyloxy-PEG-OH, or HO-PEG-OH), branched or multi-arm forms (e.g., forked PEG or PEG attached to a polyol core), pendant PEG, or PEG with degradable linkages therein, to be more fully described below.

The polymer comprises at least one hydroxyl group capable of reacting with a tertiary alkyl acrylate reagent in a Michael addition reaction. In addition to the one or more hydroxyl groups, the polymer may comprise other functional groups that would not interfere with the Michael addition reaction, such as acetal of an aldehyde having a carbon length of 1 to 25 carbons (e.g., acetaldehyde, propionaldehyde, and butyraldehyde), alkenyl, acrylate, methacrylate, acrylamide, active sulfone, hydrazide, isothiocyanate, maleimide, vinylsulfone, dithiopyridine, vinylpyridine, iodoacetamide, epoxide, glyoxal, biotin, dione, mesylate, tosylate, and tresylate.

The number of hydroxyl groups carried by the polymer and the position of the functional groups may vary. Typically, the polymer will comprise 1 to about 25 hydroxyl groups, preferably 1, 2, 3, 4, 5, 6, 7, 8, 9, or 10 hydroxyl groups. Linear polymers, such as PEG polymers, will typically comprise one or two hydroxyl groups positioned at the terminus of the polymer chain. If the PEG polymer is monofunctional (i.e., mPEG), the polymer will include a single hydroxyl group. If the PEG polymer is difunctional, the polymer may contain two hydroxyl groups, one at each terminus of the polymer chain, or may contain a single hydroxyl group and a different functional group at the opposing terminus. As would be understood, multi-arm or branched polymers may comprise a greater number of hydroxyl groups.

Multi-armed or branched PEG molecules, such as those described in U.S. Pat. No. 5,932,462, which is incorporated by reference herein in its entirety, can also be used as the PEG polymer. Generally speaking, a multi-armed or branched polymer possesses two or more polymer "arms" extending from a central branch point. For example, an exemplary branched PEG polymer has the structure:

(Formula III)

wherein $PEG_1$ and $PEG_2$ are PEG polymers in any of the forms or geometries described herein, and which can be the same or different, and L' is a hydrolytically stable linkage. An exemplary branched PEG of Formula III has the structure:

(Formula IV)

wherein $poly_a$ and $poly_b$ are PEG backbones, such as methoxy poly(ethylene glycol); R" is a nonreactive moiety, such as H, methyl or a PEG backbone; and P and Q are nonreactive linkages. In a preferred embodiment, the branched PEG polymer is methoxy poly(ethylene glycol) disubstituted lysine.

The branched PEG structure of Formula IV can be attached to a third oligomer or polymer chain as shown below:

(Formula V)

wherein $PEG_3$ is a third PEG oligomer or polymer chain, which can be the same or different from $PEG_1$ and $PEG_2$.

In another multi-arm embodiment, the polymer comprises a central core molecule derived from a polyol or polyamine, the central core molecule providing a plurality of attachments sites suitable for covalently attaching polymer arms to the core molecule in order to form a multi-arm polymer structure. An exemplary multi-arm polymer of this type has the structure:

R(—L"-PEG-OH)$_q$    (Formula VI)

wherein:

R is the hydrocarbon chain of the polyol or polyamine core molecule, typically comprising about 3 to about 150 carbon atoms, preferably about 3 to about 50 carbon atoms, and most preferably about 3 to about 10 carbon atoms (e.g., 3, 4, 5, 6, 7, 8, 9, or 10), optionally substituted with one or more heteroatoms (e.g., O, S, or N) in the hydrocarbon chain, and which may be linear or cyclic;

L" is a linkage formed from reaction of the polyol or polyamine core molecule with the polymer arms (e.g., —O— or —NH—C(O)—), and can serve as a spacer moiety;

PEG is a poly(ethylene glycol) polymer segment; and q is an integer from 3 to about 25, more preferably 3 to about 10, most preferably 3 to about 8 (e.g., 3, 4, 5, 6, 7, or 8).

The central core molecule in the multi-arm embodiment described above is derived from a molecule that provides a number of polymer attachment sites equal to the desired number of water soluble and non-peptidic polymer arms. Preferably, the central core molecule of the multi-arm polymer structure is the residue of a polyol or a polyamine bearing at least three hydroxyl or amino groups available for polymer attachment. A "polyol" is a molecule comprising a plurality of available hydroxyl groups. A "polyamine" is a molecule comprising a plurality of available amino groups. Depending on the desired number of polymer arms, the polyol or polyamine will typically comprise 3 to about 25 hydroxyl or amino groups, preferably 3 to about 10, most preferably 3 to about 8 (e.g., 3, 4, 5, 6, 7, or 8). The polyol or polyamine may include other protected or unprotected functional groups as well without departing from the invention. Although the spacing between hydroxyl or amino groups will vary, there is typically 1 to about 20 atoms, such as carbon atoms, between each hydroxyl or amino group, preferably 1 to about 5. The particular polyol or polyamine chosen will depend on the desired number of hydroxyl or amino groups needed for attachment to the polymer arms.

The polyol or polyamine core will typically have the structure R—(OH)$_p$ or R—(NH$_2$)$_p$ prior to reaction with the polymer arms, wherein R is a hydrocarbon chain, typically comprising about 3 to about 150 carbon atoms, preferably about 3 to about 50 carbon atoms, and most preferably about 3 to about 10 carbon atoms (e.g., 3, 4, 5, 6, 7, 8, 9, or 10), optionally substituted with one or more heteroatoms (e.g., O, S, or N) in the hydrocarbon chain, and which may be linear or cyclic, and p is the number of hydroxyl or amino groups and is typically 3 to about 25, preferably 3 to about 10, more preferably 3 to about 8 (e.g., 3, 4, 5, 6, 7, or 8).

Polyols that are suitable for use as the polymer core are nearly limitless. Aliphatic polyols having from 1 to about 10 carbon atoms and from 1 to about 10 hydroxyl groups may be used, including ethylene glycol, alkane diols, alkyl glycols, alkylidene alkyl diols, alkyl cycloalkane diols, 1,5-decalindiol, 4,8-bis(hydroxymethyl)tricyclodecane, cycloalkylidene diols, dihydroxyalkanes, trihydroxyalkanes, and the like. Cycloaliphatic polyols may also be employed, including straight chained or closed-ring sugars and sugar alcohols, such as mannitol, sorbitol, inositol, xylitol, quebrachitol, threitol, arabitol, erythritol, adonitol, dulcitol, facose, ribose, arabinose, xylose, lyxose, rhamnose, galactose, glucose, fructose, sorbose, mannose, pyranose, altrose, talose, tagitose, pyranosides, sucrose, lactose, maltose, and the like. More examples of aliphatic polyols include derivatives of glyceraldehyde, glucose, ribose, mannose, galactose, and related stereoisomers. Aromatic polyols may also be used, such as 1,1,1-tris(4'-hydroxyphenyl)alkanes, such as 1,1,1-tris(4-hydroxyphenyl)ethane, (1,3-adamantanediyl)diphenol, 2,6-bis(hydroxyalkyl)cresols, 2,2'alkylene-bis(6-t-butyl-4-alkylphenols), 2,2'-alkylene-bis(t-butylphenols), catechol, alkylcatechols, pyrogallol, fluoroglycinol, 1,2,4-benzenetriol, resorcinol, alkylresorcinols, dialkylresorcinols, orcinol monohydrate, olivetol, hydroquinone, alkylhydroquinones, 1,1-bi-2-naphthol, phenyl hydroquinones, dihydroxynaphthalenes, 4,4'-(9-fluorenylidene)-diphenol, anthrarobin, dithranol, bis(hydroxyphenyl)methane biphenols, dialkylstilbesterols, bis(hydroxyphenyl)alkanes, bisphenol-A and derivatives thereof, meso-hexesterol, nordihydroguaiaretic acid, calixarenes and derivatives thereof, tannic acid, and the like. Other core polyols that may be used include crown ether, cyclodextrins, dextrins and other carbohydrates (e.g., monosaccharides, oligosaccharides, and polysaccharides, starches and amylase).

Preferred polyols include glycerol, sugars such as sorbitol or pentaerythritol, and glycerol oligomers, such as hexaglycerol. A 21-arm polymer can be synthesized using hydroxypropyl-β-cyclodextrin, which has 21 available hydroxyl groups.

Exemplary polyamines include aliphatic polyamines such as diethylene triamine, N,N',N"-trimethyldiethylene triamine, pentamethyl diethylene triamine, triethylene tetramine, tetraethylene pentamine, pentaethylene hexamine, dipropylene triamine, tripropylene tetramine, bis-(3-aminopropyl)-amine, bis-(3-aminopropyl)-methylamine, and N,N-dimethyl-dipropylene-triamine. Naturally occurring polyamines that can be used in the present invention include putrescine, spermidine, and spermine. Numerous suitable pentamines, tetramines, oligoamines, and pentamidine analogs suitable for use in the present invention are described in Bacchi et al., *Antimicrobial Agents and Chemotherapy*, January 2002, p. 55-61, Vol. 46, No. 1, which is incorporated by reference herein.

The PEG polymer may alternatively comprise a forked PEG. Generally speaking, a polymer having a forked structure is characterized as having a polymer chain attached to two or more functional groups via covalent linkages extending from a hydrolytically stable branch point in the polymer. An example of a forked PEG is represented by PEG-YCH(—L—Z)$_2$, where Y is a linking group and Z is an activated terminal group for covalent attachment to a biologically active agent. The Z group is linked to CH by a linker, L, which is a chain of atoms of defined length. U.S. Pat. No. 6,362,254, the contents of which are incorporated by reference herein, discloses various forked PEG structures capable of use in the present invention. The chain of atoms, L, linking the Z functional groups (e.g., hydroxyl groups) to the branching carbon atom serve as a tethering group and may comprise, for example, an alkyl chain, ether linkage, ester linkage, amide linkage, or combinations thereof.

The PEG polymer may comprise a pendant PEG molecule having reactive groups (e.g., hydroxyl groups) covalently attached along the length of the PEG backbone rather than at the end of the PEG chain. The pendant reactive groups can be attached to the PEG backbone directly or through a linking moiety, such as an alkylene group.

Although less preferred, in addition to the above-described forms of PEG, the polymer can also be prepared with an enzymatically degradable linkage or one or more hydrolytically stable or degradable linkages in the polymer backbone, including any of the above described polymers. For example, PEG can be prepared with ester linkages in the polymer backbone that are subject to hydrolysis. As shown below, this hydrolysis results in cleavage of the polymer into fragments of lower molecular weight:

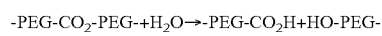

-PEG-CO$_2$-PEG-+H$_2$O→-PEG-CO$_2$H+HO-PEG-

Other hydrolytically degradable linkages, useful as a degradable linkage within a polymer backbone, include carbonate linkages; imine linkages resulting, for example, from reaction of an amine and an aldehyde (see, e.g., Ouchi et al., Polymer Preprints, 38(1): 582-3 (1997), which is incorporated herein by reference); phosphate ester linkages formed, for example, by reacting an alcohol with a phosphate group; hydrazone linkages which are typically formed by reaction of a hydrazide and an aldehyde; acetal linkages that are typically formed by reaction between an aldehyde and an alcohol; ortho ester linkages that are, for example, formed by reaction between acid derivatives and an alcohol; and oligonucleotide linkages formed by, for example, a phosphoramidite group, e.g., at the end of a polymer, and a 5' hydroxyl group of an oligonucleotide.

It is understood by those skilled in the art that the term poly(ethylene glycol) or PEG represents or includes all the above forms of PEG. Any of a variety of other polymers comprising other non-peptidic and water soluble polymer chains can also be used in the present invention. The polymer can be linear, or can be in any of the above-described forms (e.g., branched, forked, and the like). Examples of suitable polymers include, but are not limited to, other poly(alkylene glycols), copolymers of ethylene glycol and propylene glycol, poly(olefinic alcohol), poly(vinylpyrrolidone), poly(hydroxyalkylmethacrylamide), poly(hydroxyalkylmethacrylate), poly(saccharides), poly($\alpha$-hydroxyacetic acid), poly(acrylic acid), poly(vinyl alcohol), polyphosphazene, polyoxazolines, poly(N-acryloylmorpholine), such as described in U.S. Pat. No. 5,629,384, which is incorporated by reference herein in its entirety, and copolymers, terpolymers, and mixtures thereof.

Different polymers can be incorporated into the same polymer backbone. For example, one or more of the PEG molecules in the branched structures shown in Formulas III-VI can be replaced with a different polymer type. Any combination of water soluble and non-peptidic polymers is encompassed within the present invention.

The molecular weight of the polymer will vary depending on the desired application, the configuration of the polymer structure, the degree of branching, and the like. Generally, polymers having a molecular weight of about 10,000 Da to about 100,000 Da are useful in the present invention, preferably about 10,000 Da to about 60,000 Da, and more preferably about 10,000 Da to about 40,000 Da. Exemplary polymer embodiments have a molecular weight of approximately 10,000 Da, 15,000 Da, 20,000 Da, 25,000 Da, 30,000 Da, 35,000 Da, and 40,000 Da. However, lower molecular weight polymers can also be used without departing from the present invention, such as polymers having a molecular weight as low as about 100 Da (e.g., polymers having a molecular weight of about 250 Da, about 500 Da, about 750 Da, about 1,000 Da, about 1,500 Da, about 2,500 Da, and about 5,000 Da).

Useful exemplary weight average molecular weights of the polymers include about 100 Da, about 200 Da, about 300 Da, about 400 Da, about 500 Da, about 600 Da, about 700 Da, about 750 Da, about 800 Da, about 900 Da, about 1,000 Da, about 2,000 Da, about 2,500 Da, about 3,000 Da, about 4,000 Da, about 5,000 Da, about 6,000 Da, about 7,000 Da, about 7,500 Da, about 8,000 Da, about 9,000 Da, about 10,000 Da, about 11,000 Da, about 12,000 Da, about 12,500 Da, about 15,000 Da, about 20,000 Da, about 25,000 Da, and 30,000 Da, about 40,000 Da, about 50,000 Da, about 60,000 Da, about 70,000 Da, about 75,000 Da, about 80,000 Da, about 85,000 Da, about 90,000 Da, about 100,000 Da, and about 120,000 Da.

With respect to singly branched versions of the polymer, exemplary ranges of useful sizes for the total molecular weight of the polymer (as based essentially on the combined weights of the two water soluble polymer portions) include the following: from about 200 Da to about 100,000 Da; from about 1,000 Da to about 80,000 Da; from about 2,000 Da to about 60,000 Da; from about 4,000 Daltons to about 50,000 Daltons; and from about 10,000 Da to about 40,000 Da. More particularly, total weight average molecular weight of a singly branched version of the polymer of the invention corresponds to one of the following: about 400; about 1,000; about 1,500; about 2,000; about 3000; about 4,000; about 10,000; about 15,000; about 20,000; about 30,000; about 40,000; about 50,000; about 60,000; or about 80,000.

With respect to PEG, wherein a structure comprising a repeating ethylene oxide monomer, such as "—(CH$_2$CH$_2$O)$_m$—" or "—(OCH$_2$CH$_2$)$_m$—" [as in, for example, H$_3$CO—(CH$_2$CH$_2$O)$_m$—CHR$_1$—CHR$_2$—C(O)—Y, where R$_1$, R$_2$ and Y are as defined for Formula VIII] exemplary values for m include: from about 3 to about 3,000; from about 10 to about 3,000; from about 15 to about 3,000; from about 20 to about 3,000; from about 25 to about 3,000; from about 30 to about 3,000; from about 40 to about 3,000; from about 50 to about 3,000; from about 55 to about 3,000; from about 75 to about 3,000; from about 100 to about 3,000; and from about 225 to about 3,000.

B. Tertiary Alkyl Acrylate Reagent

The tertiary alkyl acrylate can be $\alpha$- or $\beta$-substituted. Exemplary substituting groups include halo, alkylthio, acyl, acyloxy, nitro, cyano, azido, trihalomethyl, alkyl, substituted alkyl, cycloalkyl, substituted cycloalkyl, alkoxy, substituted alkoxy, aryl, substituted aryl, heterocycle, substituted heterocycle, heteroaryl, and substituted heteroaryl. The tertiary alkyl acrylate is preferably unsubstituted at the $\beta$ carbon. The acrylate reagent is advantageously substituted at the $\alpha$ carbon with an alkyl or aryl group that provides steric hindrance to the final carboxylic acid group. As taught in U.S. Pat. No. 6,495,659, which is incorporated herein by reference in its entirety, the steric effects of a side chain attached to the $\alpha$ carbon can favorably affect the hydrolytic stability of drug conjugates formed using the polymer acid. In one preferred embodiment, the tertiary alkyl acrylate is $\alpha$- or $\beta$-substituted, preferably $\alpha$-substituted, with methyl, ethyl, n-propyl, isopropyl, n-butyl, isobutyl, sec-butyl, tert-butyl, or benzyl.

In one embodiment, the tertiary alkyl acrylate has the structure:

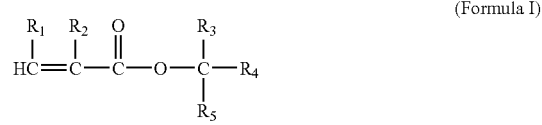

(Formula I)

wherein:

R$_1$ and R$_2$ are each independently selected from the group consisting of hydrogen, halo, alkylthio, acyl, acyloxy, nitro, cyano, azido, trihalomethyl, alkyl, substituted alkyl, cycloalkyl, substituted cycloalkyl, alkoxy, aryl, substituted aryl, heterocycle, substituted heterocycle, heteroaryl, and substituted heteroaryl; and R$_3$-R$_5$ are each independently alkyl, substituted alkyl, aryl or substituted aryl.

Preferably, R$_3$, R$_4$, and R$_5$, are each methyl, ethyl, or phenyl, and R$_1$ and R$_2$ are hydrogen or R$_1$ is hydrogen and R$_2$ is methyl, ethyl, n-propyl, isopropyl, n-butyl, isobutyl, sec-butyl, tert-butyl, or benzyl. In one preferred embodiment, the tertiary alkyl group is tert-butyl (i.e., each of R$_3$-R$_5$ is methyl). Other exemplary tertiary alkyl groups include tert-amyl, $\alpha,\alpha'$-dimethylbenzyl, trityl, 1-adamantyl, and 2-methyl-2-adamantyl.

Preferred tertiary alkyl acrylates include tert-butyl acrylate and tert-butyl methacrylate, which are commercially available from Sigma-Aldrich Corporation, St. Louis, Mo. Other exemplary tertiary alkyl acrylates include tert-butyl esters of crotonic acid or isocrotonic acid. Additionally, other tertiary alkyl or tertiary cycloalkyl acrylate or methacrylates are suitable for use in the present invention.

C. The Polymer Bearing at Least One Propionic Acid Group

Following the method described herein, the water soluble and non-peptidic polymer will bear at least one terminal propionic acid group. An exemplary polymer will correspond to the following structure:

POLY-CHR$_1$—CHR$_2$—COOH  (Formula VII)

wherein POLY is the residue of a water soluble and non-peptidic polymer (such as PEG), and R$_1$ and R$_2$ (as discussed above in Section II.B) are each independently selected from the group consisting of hydrogen, halo, alkylthio, acyl, acyloxy, nitro, cyano, azido, trihalomethyl, alkyl, substituted alkyl, cycloalkyl, substituted cycloalkyl, alkoxy, aryl, substituted aryl, heterocycle, substituted heterocycle, heteroaryl, and substituted heteroaryl. In terms of POLY, the corresponding water soluble and non-peptidic polymers are discussed above in Section II.A. PEG [e.g., "—(CH$_2$CH$_2$O)$_m$—" or "—(OCH$_2$CH$_2$)$_m$—"] is a particularly preferred POLY and is discussed above in Section II.A. In one or more embodiments, branched versions of the polymer are preferred.

If desired, the propionic acid functionalized-polymer can be further modified to form useful reactive derivatives of carboxylic acids using methodology known in the art. Thus, the invention includes polymers obtainable from and/or obtained from the described propionic acid-functionalized polymers. For example, the carboxylic acid can be further derivatized to form acyl halides, acyl pseudohalides, such as acyl cyanide, acyl isocyanate, and acyl azide, neutral salts, such as alkali metal or alkaline-earth metal salts (e.g. calcium, sodium, or barium salts), esters, anhydrides, amides, imides, hydrazides, and the like. In addition, the carboxylic acid can be reduced to form an aldehyde, either directly from the carboxylic acid using a suitable reducing agent, or indirectly through an amide, nitrile or ester using a suitable reducing agent. Also, the acid or certain functionalized polymers, e.g. active esters, may be used as intermediates to react with appropriate reagents or other small molecules or short polymeric species to form yet additional reactive derivatives such as maleimides, thiols, reactive disulfides, acetals, aldehydes and the like.

In a preferred embodiment, the propionic acid is esterified to form an active ester, such as an N-hydroxysuccinimidyl ester, o-, m-, or p-nitrophenyl ester, 1-hydroxybenzotriazolyl ester, imidazolyl ester, or N-hydroxysulfosuccinimidyl ester. The propionic acid or reactive derivative thereof attached to the polymer preferably has the structure:

—CHR$_1$—CHR$_2$—C(O)—Y  (Formula VIII)

wherein R$_1$ and R$_2$ (as discussed above in Section II.B) are each independently selected from the group consisting of hydrogen, halo, alkylthio, acyl, acyloxy, nitro, cyano, azido, trihalomethyl, alkyl, substituted alkyl, cycloalkyl, substituted cycloalkyl, alkoxy, aryl, substituted aryl, heterocycle, substituted heterocycle, heteroaryl, and substituted heteroaryl, and Y is selected from the group consisting of hydrogen, halo, hydroxy, amino, substituted amino, —NCO, —NCS, N$_3$, —CN, and —O—R', wherein R' is N-succinimidyl, nitrophenyl, benzotriazolyl, imidazolyl, N-sulfosuccinimidyl, N-phthalimidyl, N-glutarimidyl, N-tetrahydrophthalimidyl, N-norbornene-2,3-dicarboximidyl, and hydroxy-7-azabenzotriazolyl.

In one embodiment, Y is a substituted amino having the structure —NHR$_6$, wherein R$_6$ is any organic group that may contain additional reactive functional groups (e.g., aldehyde, maleimide, mercapto, and the like) and where the additional functional group or groups are separated from the carbonyl carbon by an alkylene chain (e.g., C1-6 alkylene chain) and, optionally, an additional linker, such as a short PEG chain and another alkylene chain (e.g., alkylene-PEG-alkylene).

Exemplary polymers that can be prepared through the described propionic acid-functionalized polymers include the following:

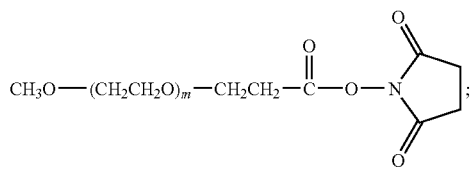

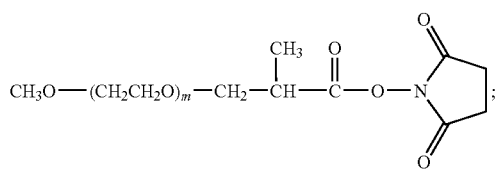

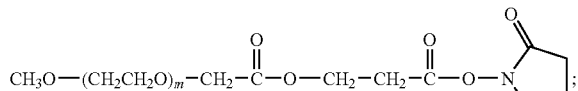

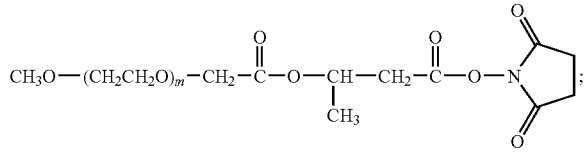

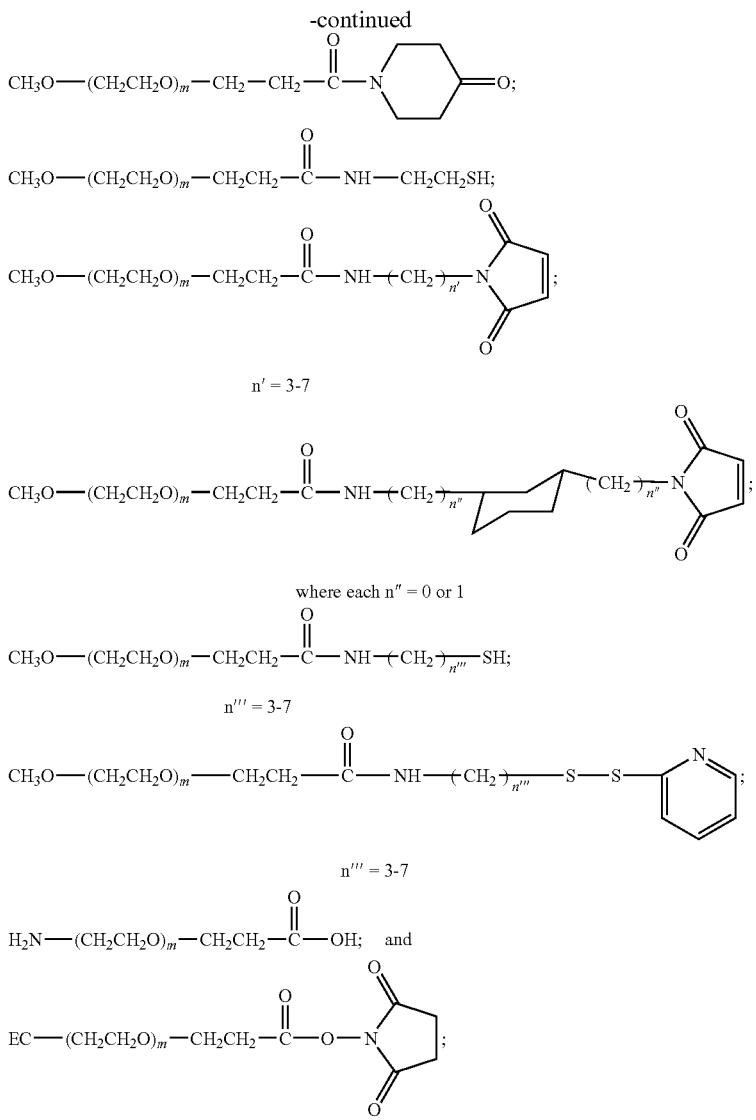

wherein m is defined as in Section II.A, above, and EC is a residue of a moiety selected from the group consisting of fluorescein, biotin, acrylate, vinylsulfone, maleimide, tert-butyl carbonyl (t-Boc), and 9-fluorenylmethoxycarbonyl (Fmoc).

In some situations, it is preferred that the polymer bearing a propionic acid is not methoxy PEG propionic acid having a weight average molecular weight of about 20,000 Da [i.e., $H_3CO-(CH_2CH_2O)_m-CH_2-CH_2-COOH$, wherein m does not result in a weight average molecular weight of about 20,000 Da], and not methoxy PEG propionic acid having a weight average molecular weight of about 30,000 Da [i.e., $H_3CO-(CH_2CH_2O)_m-CH_2-CH_2-COOH$, wherein m does not result in a weight average molecular weight of about 30,000 Da]. Furthermore, in some situations, it is preferred that the polymer bearing a propionic acid is not methoxy PEG (or other polymer) propionic acid having a weight average molecular weight of between about 17,500 Da and 22,500 Da, and not methoxy PEG propionic acid having a weight average molecular weight of between about 27,500 Da and 32,500 Da.

In still other situations, it is preferred that the weight average molecular weight of the methoxy PEG propionic acid is greater than 35,000 Da. Preferred polymers bearing a propionic acid comprise branched (i.e., singly branched or multi-branched) structures as previously discussed.

C. Biologically Active Molecules for Conjugation

The propionic acid-terminated polymer produced by the method of the invention, or a reactive derivative thereof, can be used to form conjugates with biologically active molecules, particularly biologically active molecules carrying nucleophilic functional groups, such as amino groups. Such polymer conjugates can be formed using known techniques for covalent attachment of an activated polymer, such as an activated PEG, to a biologically active agent (See, for example, *Poly(Ethylene Glycol) Chemistry and Biological Applications*, American Chemical Society, Washington, D.C. (1997)).

With respect to polymers used in conjugation, electrophilically-activated polymer derivatives, such as active esters, are useful for conjugation to amino groups on proteins or other biologically active molecules. Conjugation of a polymer bearing an active carboxylic acid ester with an amino group on a biologically active molecule results in formation of a stable amide bond between the polymer and the biologically active molecule.

A biologically active agent for use in coupling to polymer formed by the method of the invention may be any one or more of the following. Suitable agents may be selected from, for example, hypnotics and sedatives, psychic energizers, tranquilizers, respiratory drugs, anticonvulsants, muscle relaxants, antiparkinson agents (dopamine antagnonists), analgesics, anti-inflammatories, antianxiety drugs (anxiolytics), appetite suppressants, antimigraine agents, muscle contractants, anti-infectives (antibiotics, antivirals, antifungals, vaccines) antiarthritics, antimalarials, antiemetics, anepileptics, bronchodilators, cytokines, growth factors, anti-cancer agents, antithrombotic agents, antihypertensives, cardiovascular drugs, antiarrhythmics, antioxicants, anti-asthma agents, hormonal agents including contraceptives, sympathomimetics, diuretics, lipid regulating agents, antiandrogenic agents, antiparasitics, anticoagulants, neoplastics, antineoplastics, hypoglycemics, nutritional agents and supplements, growth supplements, antienteritis agents, vaccines, antibodies, diagnostic agents, and contrasting agents.

Examples of active agents suitable for use in covalent attachment to a polymer prepared by the method of the invention include, but are not limited to, calcitonin, erythropoietin (EPO), Factor VIII, Factor IX, ceredase, cerezyme, cyclosporin, granulocyte colony stimulating factor (GCSF), thrombopoietin (TPO), alpha-1 proteinase inhibitor, elcatonin, granulocyte macrophage colony stimulating factor (GMCSF), growth hormone, human growth hormone (HGH), growth hormone releasing hormone (GHRH), heparin, low molecular weight heparin (LMWH), interferon alpha, interferon beta, interferon gamma, interleukin-1 receptor, interleukin-2, interleukin-1 receptor antagonist, interleukin-3, interleukin-4, interleukin-6, luteinizing hormone releasing hormone (LHRH), factor IX insulin, pro-insulin, insulin analogues (e.g., mono-acylated insulin as described in U.S. Pat. No. 5,922,675), amylin, C-peptide, somatostatin, somatostatin analogs including octreotide, vasopressin, follicle stimulating hormone (FSH), insulin-like growth factor (IGF), insulintropin, macrophage colony stimulating factor (M-CSF), nerve growth factor (NGF), tissue growth factors, keratinocyte growth factor (KGF), glial growth factor (GGF), tumor necrosis factor (TNF), endothelial growth factors, parathyroid hormone (PTH), glucagon-like peptide thymosin alpha 1, IIb/IIIa inhibitor, alpha-1 antitrypsin, phosphodiesterase (PDE) compounds, VLA-4 inhibitors, bisphosphonates, respiratory syncytial virus antibody, cystic fibrosis transmembrane regulator (CFTR) gene, deoxyreibonuclease (Dnase), bactericidal/permeability increasing protein (BPI), anti-CMV antibody, 13-cis retinoic acid, macrolides such as erythromycin, oleandomycin, troleandomycin, roxithromycin, clarithromycin, davercin, azithromycin, flurithromycin, dirithromycin, josamycin, spiromycin, midecamycin, leucomycin, miocamycin, rokitamycin, andazithromycin, and swinolide A; fluoroquinolones such as ciprofloxacin, ofloxacin, levofloxacin, trovafloxacin, alatrofloxacin, moxifloxicin, norfloxacin, enoxacin, grepafloxacin, gatifloxacin, lomefloxacin, sparfloxacin, temafloxacin, pefloxacin, amifloxacin, fleroxacin, tosufloxacin, prulifloxacin, irloxacin, pazufloxacin, clinafloxacin, and sitafloxacin, aminoglycosides such as gentamicin, netilmicin, paramecin, tobramycin, amikacin, kanamycin, neomycin, and streptomycin, vancomycin, teicoplanin, rampolanin, mideplanin, colistin, daptomycin, gramicidin, colistimethate, polymixins such as polymixin B, capreomycin, bacitracin, penems; penicillins including penicllinase-sensitive agents like penicillin G, penicillin V, penicllinase-resistant agents like methicillin, oxacillin, cloxacillin, dicloxacillin, floxacillin, nafcillin; gram negative microorganism active agents like ampicillin, amoxicillin, and hetacillin, cillin, and galampicillin; antipseudomonal penicillins like carbenicillin, ticarcillin, azlocillin, mezlocillin, and piperacillin; cephalosporins like cefpodoxime, cefprozil, ceftbuten, ceftizoxime, ceftriaxone, cephalothin, cephapirin, cephalexin, cephradrine, cefoxitin, cefamandole, cefazolin, cephaloridine, cefaclor, cefadroxil, cephaloglycin, cefuroxime, ceforamide, cefotaxime, cefatrizine, cephacetrile, cefepime, cefixime, cefonicid, cefoperazone, cefotetan, cefinetazole, ceftazidime, loracarbef, and moxalactam, monobactams like aztreonam; and carbapenems such as imipenem, meropenem, pentamidine isethiouate, albuterol sulfate, lidocaine, metaproterenol sulfate, beclomethasone diprepionate, triamcinolone acetamide, budesonide acetonide, fluticasone, ipratropium bromide, flunisolide, cromolyn sodium, ergotamine tartrate and where applicable, analogues, agonists, antagonists, inhibitors, and pharmaceutically acceptable salt forms of the above. In reference to peptides and proteins, the invention is intended to encompass synthetic, native, glycosylated, unglycosylated, PEGylated forms, and biologically active fragments and analogs thereof.

Thus, the invention includes a composition comprising a conjugate of a propionic acid-terminated polymer (or a reactive derivative thereof) and a biologically active molecule wherein the propionic acid-terminated polymer is prepared in accordance with the method described herein. Thus, for example, the conjugate in the composition can be formed by reacting

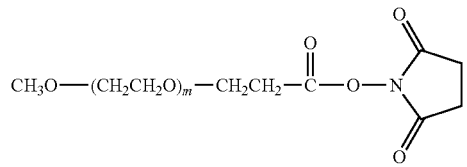

with an interferon, wherein m is defined as in Section II.A. In addition, the conjugate in the composition can be formed by reacting

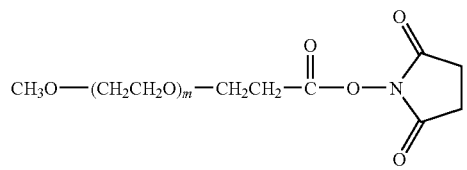

with a TNFR tumor necrosis factor receptor, wherein m is defined as in Section II.A. Further, the conjugate in the composition can be formed by reacting

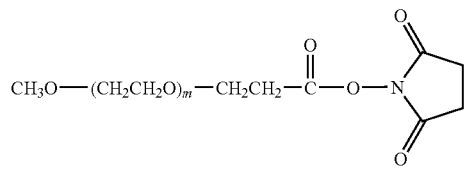

with erythropoietin, wherein m is defined as in Section II.A.

Also, the conjugate in the composition can be formed by reacting

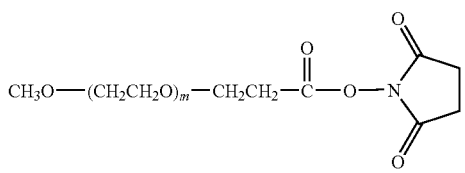

with human growth hormone, wherein m is defined as in Section II.A. Variants and mimetics of the interferon, TNFR, erythropoietin, and human growth hormone can be substituted as the biologically active agent in these conjugates. An exemplary conjugate will comprise a structure corresponding to Formula IX:

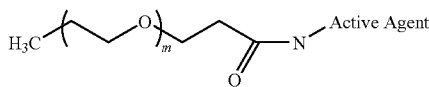

(Formula IX)

wherein Active Agent represents a residue of an amine-containing active agent and m is defined as in Section II.A.

Because the compositions include conjugates prepared from propionic acid-terminated polymers (or a reactive derivative thereof) formed by the presently described method—which results in reduced degradation and chain cleavage of the polymer backbone—the resulting conjugates and compositions likewise have reduced degradation and chain cleavage of the polymer backbone, at least as compared to conjugates prepared from propionic acid-terminated polymers (or reactive derivatives thereof) prepared by alternate methods (i.e., methods different from the presently described method for synthesizing propionic acid-terminated polymers, or a reactive derivatives thereof).

In particular, the presently described method unexpectedly and advantageously provides propionic-acid terminated polymers (as well as reactive derivatives and conjugates) that are more pure as a result of reduced degradation and chain cleavage. The method particularly improves the purity when the propionic acid-terminated polymer comprises propionic-acid terminated poly(ethylene oxide) bearing a methoxy end-cap.

For example, a propionic acid-terminated poly(ethylene oxide) bearing a methoxy end-cap [e.g., $CH_3O—(CH_2CH_2O)_m—CH_2CH_2COOH$)] comprises ether groups, each ether group having an oxygen atom with a certain sensitivity to cleavage via nucleophilic attack. While not wishing to be bound by theory, it appears for at least three reasons that the most sensitive ether group in the polymer prone to cleave is the ether group associated with the methoxy end-cap.

First, for reasons of accessibility, the ether group associated with the methoxy end-cap is the most exposed and subsequently relatively available for a chain-cleaving nucleophilic attack. Second, the oxygen in the ether group associated with the methoxy end-cap is more basic than the oxygens in the ether groups associated with the repeating ethylene oxide monomers. This is so because the oxygens in the ether groups associated with the repeating ethylene oxide monomers have the benefit of two neighboring ether oxygens (and their electron-withdrawing effects) while the oxygen associated with the methoxy end-cap has only a single neighboring ether oxygen. Third, while the oxygen in the ether group nearest the carboxylic acid group also only has a single neighboring ether oxygen, this oxygen benefits from the neighboring and stability-enhancing carboxylic acid group that serves as a electron sink.

The above analysis can be illustrated in Schematic A, where the arrows in the left structures show electron-donating and electron-withdrawing effects of the attached groups and the right-hand structures are compared for the relative stability of the protonated forms. In Schematic A, m is defined as in Section II.A.

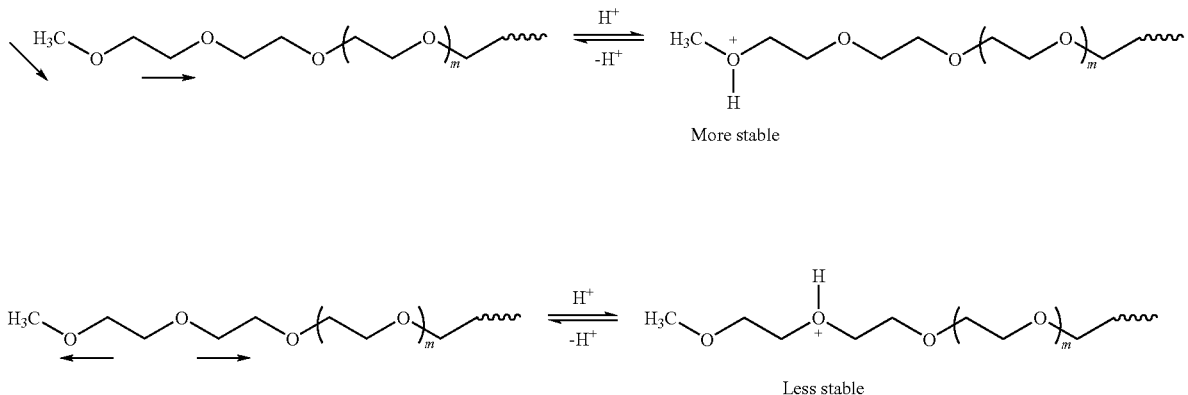

Schematic A

More stable

Less stable

Again, while not wishing to be bound by theory, it is believed that of the two right-hand structures in the above schematic, a nucleophile is most likely to attack by backside nucleophilic displacement at the carbon at the protonated methoxy oxygen (top, right-hand structure in the above schematic). Reasons for this preference include a lower degree of steric hindrance at the methyl group (thereby favoring methyl group displacement) and a higher degree of steric hindrance within the polymer backbone, as shown in Schematic B. In Schematic B, m is defined as in Section II.A.

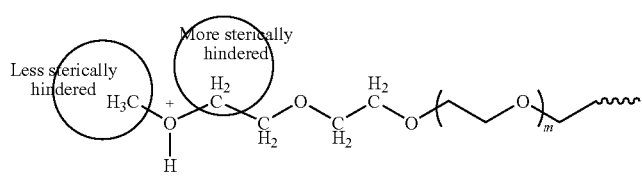

Schematic B

Thus, for example, if a hydrogen sulfate anion is the nucleophile that will produce chain cleavage, the favored pathway for cleavage is believed to be the loss of the methyl group of the methoxy end-cap. See Schematic C, wherein m is defined as in Section II.A. This process will lead to formation of a hydroxyl end-cap in place of the methoxy end-cap (a "demethylated polymer"). This hydroxyl end-capped side product impurity was neither observed nor reported in the "nitrile-based" method described in U.S. Pat. No. 5,672,662 because the hydroxyl end-capped polymer has essentially the same high performance liquid chromatography ("HPLC") retention properties as the corresponding methoxy end-capped species as each has essentially the same molecular weight. It will be recalled that the "nitrile-based" method described for preparing propionic acid-terminated polymers in U.S. Pat. No. 5,672,662 requires the use of relatively harsh conditions such as one or more of (a) using strong concentrated mineral acids like sulfuric acid, or hydrochloric acid, (b) high temperatures, and (c) very long reaction times (exceeding 30 hours in the case of hydrochloric acid-promoted hydrolysis).

taining impurity (such as that shown in Formula X) can (i) compete with a reactive component of another molecule (e.g., the hydroxyl group of a reagent used to form polymer derivatives), and/or (ii) ultimately result in one or more hydroxyl end-capped conjugate species.

The side product impurity (such as that shown in Formula X) can react with other molecules to form additional species that are not desired to be present in the composition. For example, during esterification to form a reactive ester, the side product impurity bearing a hydroxyl end-cap will compete with the hydroxyl group of the ester-forming N-hydroxysuccinimide reagent, thereby forming a dimeric species wherein two polymers are linked. This unintended reaction does occur when, for example, a side product impurity corresponding to Formula X is present in the reaction mixture, thereby resulting in the formulation of the dimeric species shown in Formula XI:

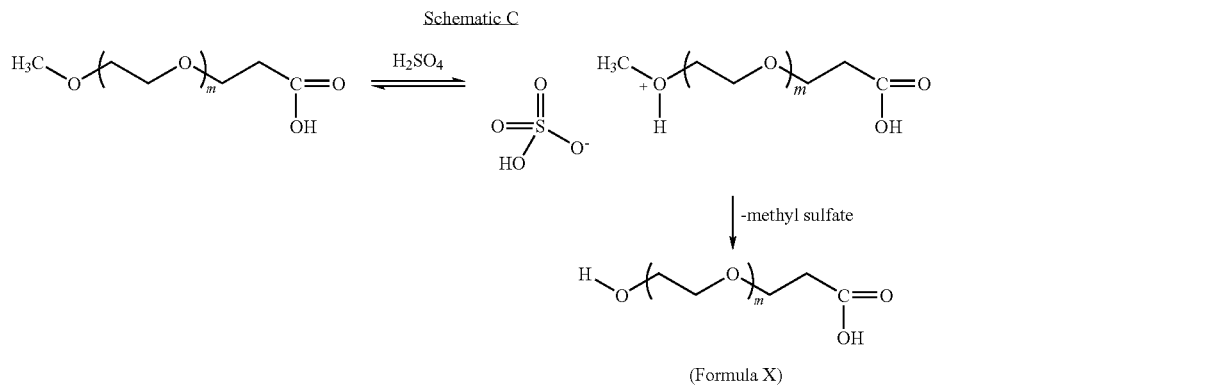

(Formula X)

It is preferred, then, that a composition disclosed in the invention is substantially free of side product impurities bearing a hydroxyl end-cap (e.g., substantially free of HO—$(CH_2CH_2O)_m$—$CH_2CH_2COOH$ species). In this regard, a composition that is substantially free of side product impurities bearing a hydroxyl end-cap will contain less than about 15% by weight, more preferably less than about 10% by weight, more preferably less than about 5% by weight, still more preferably less than about 3% by weight, yet still more preferably less than about 2% by weight of side product impurities bearing a hydroxyl end-cap, with less than about 1% by weight being most preferred.

The side product impurity—bearing a hydroxyl end-cap as show in Formula X—can introduce additional unwanted species in a composition. In particular, a hydroxyl end-cap-con- (Formula XI)

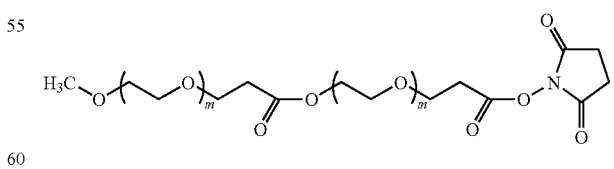

wherein m is defined as in Section II.A. In contrast to a simply demethylated impurity, the dimeric species is readily observable by gel permeation chromatography (GPC) or HPLC because it has a higher molecular weight.

It is preferred, then, that a composition disclosed in the invention is substantially free of species comprising a structure corresponding to a dimeric species (e.g., hydroxyl end-capped and methoxy end-capped as shown in Formula XI). In this regard, a composition that is substantially free of dimeric species will contain less than about 10% by weight, more preferably less than about 5% by weight, more preferably less than about 4% by weight, still more preferably less than about 3% by weight, yet still more preferably less than about 2% by weight of dimeric species, with less than about 1% by weight being most preferred.

As previously indicated, the hydroxyl end-cap-containing impurity (such as the one shown in Formula X) can ultimately result in one or more species of hydroxyl end-capped polymer-active agent conjugates. Thus, for example, an impurity having a structure comprising a structure corresponding to Formula X can—when subject to an esterification reaction with N-hydroxysuccinimide—result in a species comprising a structure corresponding to Formula XII:

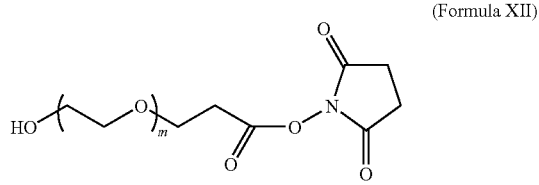

(Formula XII)

wherein m is defined as in Section II.A.

It should also be noted that a species comprising a structure corresponding to Formula XII can result via an esterification reaction if the original starting methoxy end-capped poly(ethylene glycol) material used to prepare a propionic acid-terminated polymer is contaminated with "diol" poly(ethylene glycol), i.e., HO—(CH$_2$CH$_2$O)$_m$—H. In this regard, it is preferred to use starting methoxy end-capped poly(ethylene glycol) compositions comprising less than 2% by weight of "diol" poly(ethylene glycol).

If a species comprising a structure corresponding to Formula XII is subsequently combined with an amine-containing active agent, then a hydroxyl end-capped conjugate having a species comprising a structure corresponding to Formula XIII can be formed:

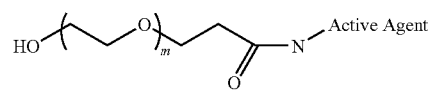

(Formula XIII)

wherein Active Agent represents a residue of an amine-containing active agent and m is defined as in Section II.A. A species comprising a structure corresponding to Formula XII could also lead to a conjugate comprising a structure corresponding to Formula XIV:

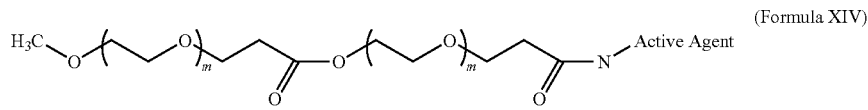

(Formula XIV)

wherein Active Agent represents a residue of an amine-containing active agent and m is defined as in Section II.A. In addition, a species comprising a structure corresponding to Formula XII could result in a conjugate comprising a hydroxyl end-capped structure corresponding to corresponding to Formula XV:

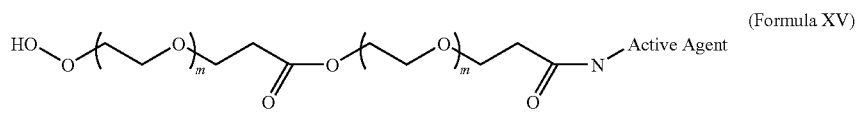

(Formula XV)

wherein Active Agent represents a residue of an amine-containing active agent and m is defined as in Section II.A.

Each of the impurities comprising a structure corresponding to one of Formulae X, XII, and XIII include a hydroxyl end-cap (or "demethylated" group). As pointed out above, the special concern with a composition comprising a relatively large amount of one or more of these or other hydroxyl end-capped species is the ability of the impurity to react with an active agent when the composition is used in a conjugation reaction. The result can be the formation of second, third and fourth conjugate species, such as the intended conjugate (e.g, a species comprising a structure corresponding to Formula IX), and one or more unintended conjugates (e.g., one or more species comprising a structure corresponding to Formulas XII or XIV. It has been found that mixtures of various conjugate species reduces the consistency, performance, and reproducibility of the resulting composition.

It is preferred that the composition is substantially free of conjugate species corresponding to any one or combination of Formulae XIII, XIV, and XV. In this regard, a composition that is substantially free of conjugate species corresponding to any one or combination of Formulae XIII, XIV and XV will contain less than about 10% by weight, more preferably less than about 5% by weight, more preferably less than about 4% by weight, still more preferably less than about 3% by weight, yet still more preferably less than about 2% by weight of conjugate species corresponding to any one or combination of Formulae XIII, XIV, and XV, with less than about 1% by weight being most preferred.

EXPERIMENTAL

The following examples are given to illustrate the invention, but should not be considered in limitation of the invention. For example, although monofunctional PEG reagents are used in the examples to illustrate the invention, difunctional or multifunctional PEG polymers could also be used in the present invention, as well as other types of water soluble and non-peptidic polymers.

Unless otherwise noted, all PEG reagents referred to in the appended examples are available from Nektar AL of Huntsville, Ala. All NMR data was generated by a 300 or 400 MHz NMR spectrometer manufactured by Bruker.

Example 1 illustrates formation of a 20,000 Da mPEG-propionic acid polymer using tert-butyl acrylate as the tertiary alkyl acrylate reagent and tetrabutylammonium hydroxide, formed in situ from tetrabutylammonium bromide and potassium hydroxide, as the Michael addition catalyst. TFA is used to cleave the tert-butyl group. Example 2 is similar to Example 1, except a 20,000 Da benzyloxy-PEG-propionic acid polymer is formed using the direct addition of tetrabutylammonium hydroxide as the catalyst. Example 3 is similar to Example 1, except the MPEG has a molecular weight of 30,000 Da.

Comparative Example 1 shows that the synthesis method outlined in Example 1 of U.S. Pat. No. 5,523,479 to Sanders et al. fails to produce the desired propionic acid, tert-butyl ester, when using a 20,000 Da polymer starting material. It is believed that the method disclosed in U.S. Pat. No. 5,523,479 is ineffective in forming higher molecular weight propionic acid functionalized polymers of the type utilized in the present invention. In particular, it is believed that the catalysts suggested in the Sanders patent are incapable of promoting the Michael addition reaction to any significant degree when a higher molecular weight polymer starting material is used.

Comparative Example 2 shows that the synthesis method outlined in Example 1 of U.S. Pat. No. 5,672,662 to Harris et al. fails to produce pure m-PEG (20,000 Da)-propionic acid, when using a 20,000 Da low diol contaminated methoxy-end-capped PEG starting material, because the relatively harsh reaction conditions lead to the demethylation and chain cleavage of methoxy-end-capped and produce substantial amount of HO-PEG (20,000 Da)-propionic acid.

Example 1

Synthesis of mPEG (20,000 Da)-Propionic Acid

A. mPEG (20,000 Da)-Propionic Acid, Tert-Butyl Ester

A solution of MPEG (20,000 Da) (35.0 g, 0.00175 moles) (NOF Corporation) and tetrabutylammonium bromide (0.6 g) in toluene (125 ml) was azeotropically dried by distilling off 105 ml of toluene. Potassium hydroxide (0.15 g) in form of fine powder was added and the mixture was warmed up to 60° C. under argon atmosphere. Then tert-butyl acrylate (2.0 ml, 0.01365 moles, 7.8 fold excess) was added during 2 h and the mixture was stirred overnight at 60° C. under argon atmosphere. Next the solvent was distilled off under reduced pressure and the residue was dissolved in dichloromethane (400 ml). The resulting solution was washed two times with deionized water (2×50 ml) and then dried with anhydrous magnesium sulfate. Next the solvent was distilled off under reduced pressure. Yield 28.5 g. NMR ($d_6$-DMSO): 1.40 ppm (s, $(CH_3)_3$ C—, 9H), 2.41 ppm (t, —$CH_2$—COO—, 2H), 3.24 ppm (s, —$OCH_3$, 3H), 3.51 ppm (s, PEG backbone); substitution 69.1%.

B. mPEG (20,000 Da)-Propionic Acid mPEG (20,000 Da)-Propionic Acid, tert-Butyl Ester (20 g) from Step A was dissolved in a dichloromethane/trifluoroacetic acid mixture (1:1; 120 ml) and the solution was stirred 1 h at 60° C. After cooling to room temperature, dichloromethane (400 ml) was added to the reaction mixture and the resulting solution was washed with deionized water (400 ml), and dried with anhydrous magnesium sulfate. Next the solvent was distilled off under reduced pressure. The crude product was dissolved in deionized water (400 ml) and the pH of the solution was adjusted to 12 with 1.0M NaOH. The solution was stirred 2 h at pH=12. Next NaCl (40 g) was added and the pH was adjusted to 3 with 10-% phosphoric acid. The product was extracted with dichloromethane, the solution was dried with anhydrous magnesium sulfate, and the solvent was distilled off under reduced pressure giving 16.5 g of white solid product. Anion exchange chromatography showed that the product contains: m-PEG (20,000 Da)-propionic acid 68.2% and m-PEG-20K 31.8%. Next the product was chromatographically purified using typical anion exchange chromatography media giving 100% pure PEG (20,000 Da)-propionic acid (9.8 g). In this regard, "100% PEG (20,000 Da)-propionic acid" means 100% pure PEG (20,000 Da)-monopropionic acid.

NMR ($d_6$-DMSO): 2.43 ppm (t, —$CH_2$—COO—, 2H), 3.24 ppm (s, —$OCH_3$, 3H), 3.51 ppm (s, PEG backbone); No PEG-OH groups were detected by NMR (no triplet at 4.58 ppm); This experimental result means that the product was 100% pure mPEG (20,000 Da)-monopropionic acid with no detectable HO-PEG (20,000 Da)-propionic acid present.

Example 2

Synthesis of Benzyloxy-PEG (20,000 Da)-Propionic Acid

A solution of benzyloxy-PEG (20,000 Da) (35.0 g, 0.00175 moles) (NOF Corporation) and tetrabutylammonium hydroxide (2.0 g of 40 wt % solution in water) in toluene (200 ml) was azeotropically dried by distilling off 175 ml toluene. The obtained solution was warmed up to 65° C. under argon atmosphere. Then tert-butyl acrylate (1.5 ml, 0.01024 moles, 5.85 fold excess) was added during 3.5 hours and the mixture was stirred overnight at 60-65° C. under argon atmosphere. Next the solvent was distilled off under reduced pressure and the residue was dissolved in dichloromethane (40 ml).

Trifluoroacetic acid (40 ml) was added and the solution was heated to boiling for 2 h. Dichloromethane and trifluoroacetic acid were distilled off under reduced pressure and the crude product was dissolved in 400 ml deionized water. The pH was adjusted to 12 with 1.0M NaOH and the solution was stirred 2 h at pH=12. Next NaCl (40 g) was added and the pH was adjusted to 3 with 10% phosphoric acid. The product was extracted with dichloromethane, the extract was dried with anhydrous magnesium sulfate, and the solvent was distilled off under reduced pressure giving 28.5 g of white solid product. Anion exchange chromatography showed that the product contains: PEG (20,000 Da)-monopropionic acid 69.7% and PEG (20,000 Da) 30.3%. Next the product was chromatographically purified giving 100% pure PEG (20,000 Da)-monopropionic acid. NMR ($d_6$-DMSO): 2.43 ppm (t, —$CH_2$—COO—, 2H), 3.24 ppm (s, —$OCH_3$, 3H), 3.51 ppm (s, PEG backbone), 4.49 ppm (s, —$CH_2$—, benzyloxy, 2H), 7.33 ppm (m, $C_6H_5$—, 5H). No PEG-OH groups were detected (no triplet at 4.58 ppm); This means that the product was 100% pure benzyloxy -PEG (20,000 Da)-propionic acid.

Example 3

Synthesis of mPEG (30,000 Da)-Propionic Acid

A. mPEG (30,000 Da)-Propionic Acid, Tert-Butyl Ester

A solution of mPEG (30,000 Da) (50.0 g, 0.00167 moles) (NOF Corporation) and tetrabutylammonium bromide (0.8 g) in toluene (200 ml) was azeotropically dried by distilling off 100 ml toluene. Potassium hydroxide (0.16 g) in form of fine powder was added and the mixture was warmed up to 60° C. under argon atmosphere. Then tert-butyl acrylate (2.5 ml, 0.01707 moles, 10.2 fold excess) was added during 4 h and the mixture was stirred overnight at 60° C. under argon atmosphere. Next the solvent was distilled off under reduced pressure and the residue was dissolved in dichloromethane (400 ml). The obtained solution was washed two times with deionized water (2×100 ml) and then dried with anhydrous magnesium sulfate. Next the solvent was distilled off under reduced pressure giving 42.5 g of solid product. NMR ($d_6$-DMSO): 1.40 ppm (s, $(CH_3)_3C$—, 9H) 2.41 ppm (t, —$CH_2$—COO—, 2H), 3.24 ppm (s, —$OCH_3$, 3H), 3.51 ppm (s, PEG backbone); substitution 73.8%.

B. mPEG (30,000 Da)-Propionic Acid mPEG (30,000 Da)-Propionic Acid, tert-Butyl Ester (40 g) from Step A was dissolved in a dichloromethane/trifluoroacetic acid mixture (1:1; 150 ml) and the solution was stirred 1 h at 55° C. After cooling to room temperature, dichloromethane (600 ml) was added to the reaction mixture and the solution was washed with deionized water (400 ml), and dried with anhydrous magnesium sulfate. Next the solvent was distilled off under reduced pressure. The crude product was dissolved in deionized water (800 ml) and the pH of the solution was adjusted to 12 with 1.0M NaOH. The solution was stirred 2 h at pH=12. Next, NaCl (80 g) was added and the pH was readjusted to 3 with 10% phosphoric acid. The product was extracted with dichloromethane giving 33.5 g of white solid product. Anion exchange chromatography showed that the product contains: PEG (30,000 Da)-monopropionic acid 67.7% and PEG (30,000 Da) 32.3%. Next, the product was chromatographically purified using typical anion exchange chromatography media giving 100% pure PEG (30,000 Da)-monopropionic acid (25.3 g).

NMR ($d_6$-DMSO): 2.43 ppm (t, —$CH_2$—COO—, 2H), 3.24 ppm (s, —$OCH_3$, 3H), 3.51 ppm (s, PEG backbone). No PEG-OH groups were detected (no triplet at 4.58 ppm); This means that the product was 100% pure mPEG (30,000 Da)-propionic acid.

Comparative Example 1

Attempted Synthesis of mPEG (20,000 Da)-Propionic Acid, Tert-Butyl Ester

Using the method outlined in Example 1 of U.S. Pat. No. 5,523,479, a solution of MPEG (20,000 Da) (35.0 g, 0.00175 moles) (NOF Corporation) in toluene (125 ml) was azeotropically dried by distilling off 105 ml of solvent. Potassium hydroxide (0.15 g) in the form of fine powder was added and the mixture was warmed to 60° C. under argon atmosphere. Then tert-butyl acrylate (2.0 ml, 0.01365 moles, 7.8 fold excess) was added during 2 hours and the mixture was stirred overnight at 60° C. under argon atmosphere. Next, the solvent was distilled off under reduced pressure. Yield 36.5 g. NMR analysis showed that the polymer starting material was unchanged: mPEG (20,000 Da). NMR ($d_6$-DMSO): 3.24 ppm (s, —$OCH_3$, 3H), 3.51 ppm (s, PEG backbone), 4.58 ppm (t, —OH, 1H).

Comparative Example 2

Synthesis of mPEG (20,000 Da)-Propionic Acid According to U.S. Pat. No. 5,672,662

A. mPEG (20,000 Da)-Propionitrile

A mixture of mPEG (20,000 Da) (25.0 g, 0.00125 moles) (NOF Corporation), distilled water (25.0 ml) and potassium hydroxide (0.5 g) was cooled to 0-5° C. in an ice bath. Acrylonitrile (3.4 g) was added slowly, and the solution was stirred for three hours at 0-5° C. Ten percent NaCl solution (225 ml) was added to the reaction mixture and the product was extracted with dichloromethane (200, 100, and 50 ml). The organic layer was dried over magnesium sulfate, and the solvent was distilled off under reduced pressure. The crude product was dissolved in dichloromethane (35 ml) and precipitated with isopropanol (225 ml) at room temperature. The precipitate was removed by filtration and dried under vacuum. Yield of M-PEG nitrile 23.5 g.

B. mPEG (20,000 Da)-Propionamide

A mixture of M-PEG nitrile from the above step (23.5 g) and concentrated hydrochloric acid (117.5 g) was stirred at, room temperature for 48 hours. The solution was diluted with one liter of water and extracted with dichloromethane (200, 150, and 100 ml). The combined organic extracts were washed twice with water, dried over magnesium sulfate, filtered, and concentrated to dryness by rotary evaporation. Yield of PEG amide 21.5 g.

C. mPEG (20,000 Da)-Propionic Acid

M-PEG amide from the above step (16.0 g) was dissolved in 1150 ml of distilled water, 100 g of potassium hydroxide was added, and the solution was stirred for 22 hours at room temperature. Sodium chloride (150 g) was added, and the solution was extracted with dichloromethane (150 ml×3).

The combined organic extracts were washed with 5% phosphoric acid, water (twice), and dried over magnesium sulfate. Next, the solvent was distilled off under reduced pressure giving 14.0 g of white solid product. Anion exchange chromatography showed that the product contains: PEG (20,000 Da)-propionic acid 62.5%; and PEG-20K 37.5%. Next, the product was chromatographically purified using typical anion exchange chromatography media giving 100% pure PEG (20,000 Da)-monopropionic acid (6.5 g). NMR ($d_6$-DMSO): 2.43 ppm (t, —$CH_2$—COO—, 2H), 3.24 ppm (s, —$OCH_3$, 2.61H), 3.51 ppm (s, PEG backbone, 1725H), 4.58 ppm (t, PEG-OH, 0.13H). NMR analysis (triplet at 4.58) showed that the product contained 13 mol % of PEG-OH groups; this means that the product was a mixture of the desired mPEG (20,000 Da)-Propionic Acid (87%) and HO-PEG (20,000)-Propionic Acid (13%).

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included. Although specific terms are employed herein, they are used in a generic and descriptive sense only and not for purposes of limitation.

All articles, books, patents and other publications referenced herein are hereby incorporated by reference in their entireties.

What is claimed is:

1. A method for preparing a water soluble and non-peptidic polymer functionalized with at least one propionic acid group, the method comprising:

i) reacting a water soluble and non-peptidic polymer comprising at least one hydroxyl group with a tertiary alkyl acrylate in the presence of a catalyst comprising a quaternary ammonium salt to form a propionic acid ester of the polymer, wherein the polymer has a weight average molecular weight of at least about 10,000 Da; and ii) treating the propionic acid ester of the polymer with a strong acid to form a propionic acid-functionalized polymer;

with the proviso that the water soluble and non-peptidic polymer functionalized with at least one propionic acid group is neither methoxy PEG propionic acid having a weight average molecular weight of about 20,000 Da, nor methoxy PEG propionic acid having a weight average molecular weight of about 30,000 Da.

2. The method of claim 1, wherein the tertiary alkyl acrylate is α- or β-substituted.

3. The method of claim 2, wherein the substituting group is selected from the group consisting of halo, hydroxyl, thiol, alkylthio, acyl, acyloxy, nitro, cyano, azido, trihalomethyl, alkyl, substituted alkyl, cycloalkyl, substituted cycloalkyl, alkoxy, substituted alkoxy, aryl, substituted aryl, heterocycle, substituted heterocycle, heteroaryl, and substituted heteroaryl.

4. The method of claim 3, wherein the substituting group is selected from the group consisting of methyl, ethyl, n-propyl, isopropyl, n-butyl, isobutyl, sec-butyl, tert-butyl, and benzyl.

5. The method of claim 1, wherein the tertiary alkyl group of the tertiary alkyl acrylate is tert-butyl, tert-amyl, α,α'-dimethylbenzyl, trityl, 1-adamantyl, or 2-methyl-2-adamantyl.

6. The method of claim 1, wherein the tertiary alkyl acrylate has the structure:

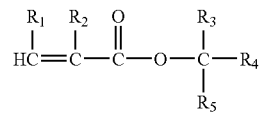

wherein:

$R_1$ and $R_2$ are each independently selected from the group consisting of hydrogen, halo, hydroxyl, thiol, alkylthio, acyl, acyloxy, nitro, cyano, azido, trihalomethyl, alkyl, substituted alkyl, cycloalkyl, substituted cycloalkyl, alkoxy, substituted alkoxy, aryl, substituted aryl, heterocycle, substituted heterocycle, heteroaryl, and substituted heteroaryl; and $R_3$-$R_5$ are each independently alkyl, substituted alkyl, aryl or substituted aryl.

7. The method of claim 6, wherein $R_3$, $R_4$, and $R_5$, are each methyl, ethyl, or phenyl.

8. The method of claim 6, wherein $R_1$ and $R_2$ are hydrogen.

9. The method of claim 6, wherein $R_1$ is hydrogen and $R_2$ is selected from the group consisting of methyl, ethyl, n-propyl, isopropyl, n-butyl, isobutyl, sec-butyl, tert-butyl, and benzyl.

10. The method of claim 1, wherein the strong acid is trifluoroacetic acid, trifluoromethanesulfonic acid, formic acid, hydrochloric acid, or toluenesulfonic acid.

11. The method of claim 1, wherein the catalyst comprising the quaternary ammonium salt is selected from the group consisting of tetramethyl ammonium halide, tetraethyl ammonium halide, tetrapropyl ammonium halide, tetrabutyl ammonium halide, tetramethyl ammonium hydroxide, tetraethyl ammonium hydroxide, tetrapropyl ammonium hydroxide, and tetrabutyl ammonium hydroxide.

12. The method of claim 1, wherein the catalyst comprising the quaternary ammonium salt has the structure:

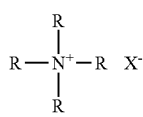

wherein each R is independently alkyl or substituted alkyl and X is a counter ion.

13. The method of claim 12, wherein each R is C1-C8 alkyl and X is halo or hydroxide.

14. The method of claim 1, wherein said reacting step and said treating step are conducted in the presence of an organic solvent.

15. The method of claim 14, wherein the organic solvent is selected from the group consisting of dichloromethane, tetrahydrofuran, dimethylformamide, acetonitrile, toluene, xylene, phenylacetonitrile, nitrobenzene, tetrachloroethylene, anisole, and chlorobenzene.

16. The method of claim 1, wherein the polymer has a weight average molecular weight of about 10,000 to about 100,000 Da.

17. The method of claim 16, wherein the polymer has a weight average molecular weight of about 20,000 to about 60,000 Da.

18. The method of claim 1, wherein the water soluble and non-peptidic polymer is selected from the group consisting of poly(alkylene glycols), poly(olefinic alcohol), poly(vinylpyrrolidone), poly(hydroxyalkylmethacrylamide), poly(hydroxyalkylmethacrylate), poly(saccharides), poly(α-hydroxyacetic acid), poly(acrylic acid), poly(vinyl alcohol), polyphosphazene, polyoxazolines, poly(N-acryloylmorpholine), and copolymers or terpolymers thereof.

19. The method of claim 1, wherein the water soluble and non-peptidic polymer is poly(ethylene glycol).

20. The method of claim 19, wherein the poly(ethylene glycol) is selected from the group consisting of monofunctional PEG, difunctional PEG, and branched PEG.

21. The method of claim 19, wherein the poly(ethylene glycol) has a weight average molecular weight of about 10,000 to about 100,000 Da.

22. The method of claim 21, wherein the poly(ethylene glycol) has a weight average molecular weight of about 20,000 to about 60,000 Da.

23. The method of any one of claims 1, 2, 3, 4, 5, 6, 7, 8, 9, 10, 11, 12, 13, 14, 15, 16, 17, 18, 19, 20, 21 and 22, further comprising the step of chromatographically purifying the propionic acid of the polymer to separate the propionic acid of the polymer from impurities bearing a hydroxyl end-cap.

24. The method of claim 23, further comprising derivatizing the propionic acid-functionalized polymer to form a reactive derivative.

25. The method of claim 1, further comprising derivatizing the propionic acid-functionalized polymer to form an acid derivative selected from the group consisting of acyl halide, acyl pseudohalide, ester, anhydride, amide, imide, and hydrazide.

26. The method of claim 1, further comprising derivatizing the propionic acid-functionalized polymer to form an active ester.

27. The method of claim 26, wherein the active ester is selected from the group consisting of N-succinimidyl ester, o-, m-, or p-nitrophenyl ester, 1-benzotriazolyl ester, imidazolyl ester, and N-sulfosuccinimidyl ester.

28. A method for preparing a branched water soluble and non-peptidic polymer functionalized with at least one propionic acid group, the method comprising:
   i) reacting a branched water soluble and non-peptidic polymer comprising at least one hydroxyl group with a tertiary alkyl acrylate in the presence of a catalyst to form a propionic acid ester of the polymer, wherein the polymer has a weight average molecular weight of at least about 10,000 Da; and
   ii) treating the propionic acid ester of the polymer with a strong acid to form a propionic acid of the polymer.

* * * * *

UNITED STATES PATENT AND TRADEMARK OFFICE
CERTIFICATE OF CORRECTION

| | |
|---|---|
| PATENT NO. | : 7,608,663 B2 |
| APPLICATION NO. | : 11/040142 |
| DATED | : October 27, 2009 |
| INVENTOR(S) | : Kozlowski et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 695 days.

Signed and Sealed this

Twelfth Day of October, 2010

David J. Kappos
*Director of the United States Patent and Trademark Office*